US009313614B2

(12) United States Patent
Alsehly et al.

(10) Patent No.: US 9,313,614 B2
(45) Date of Patent: Apr. 12, 2016

(54) METHOD OF AND SYSTEM FOR ESTIMATING POSITION

(71) Applicant: SENSEWHERE LIMITED, Edinburgh (GB)

(72) Inventors: Firas Alsehly, Edinburgh (GB); Zankar Upendrakumar Sevak, Edinburgh (GB); Tughrul Sati Arslan, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 1 day.

(21) Appl. No.: 14/400,811

(22) PCT Filed: May 10, 2013

(86) PCT No.: PCT/GB2013/051222
§ 371 (c)(1),
(2) Date: Nov. 13, 2014

(87) PCT Pub. No.: WO2013/171465
PCT Pub. Date: Nov. 21, 2013

(65) Prior Publication Data
US 2015/0189467 A1 Jul. 2, 2015

Related U.S. Application Data

(60) Provisional application No. 61/650,110, filed on May 22, 2012.

(30) Foreign Application Priority Data

May 14, 2012 (GB) .................................. 1208407.5

(51) Int. Cl.
*H04W 4/02* (2009.01)
*G01S 5/02* (2010.01)

(52) U.S. Cl.
CPC ............... *H04W 4/02* (2013.01); *G01S 5/0236* (2013.01); *G01S 5/0252* (2013.01)

(58) Field of Classification Search
None
See application file for complete search history.

(56) References Cited

U.S. PATENT DOCUMENTS 6,038,444 A * 3/2000 Schipper et al. ............... 455/421
6,327,471 B1 * 12/2001 Song ............................. 455/440

(Continued)

FOREIGN PATENT DOCUMENTS

WO  2005/004527     1/2005
WO  WO 2005/004527  1/2005

(Continued)

OTHER PUBLICATIONS

International Search Report for PCT/GB2013/051222, mailed Sep. 1, 2014, six pages.

*Primary Examiner* — Ashish K Thomas
(74) *Attorney, Agent, or Firm* — Nixon & Vanderhye PC

(57) ABSTRACT

A method of estimating the position of a user device is provided. The user device is initially in electronic communication with a positioning system controller through a communication network. The method comprises determining that a user device meets one or more proximity criteria with respect to an offline region where electronic communication between the user device and the positioning system controller, through the communication network, is expected to meet one or more failure criteria. Responsive thereto and in advance of the user device entering the said offline region, the positioning system controller transmitting local positioning data to the user device, the local positioning data comprising data concerning electromagnetic signal sources in the said offline region. The user device subsequently estimates its position while it is within the offline region by measuring signal data from a plurality of electromagnetic signal sources and processing the measured signal data and the local positioning data. The method may be used by, for example, a smartphone to estimate its position.

31 Claims, 13 Drawing Sheets

(56) References Cited

U.S. PATENT DOCUMENTS

| | | | |
|---|---|---|---|
| 6,597,906 B1 * | 7/2003 | Van Leeuwen et al. | 455/422.1 |
| 6,721,572 B1 * | 4/2004 | Smith et al. | 455/456.1 |
| 7,970,414 B1 * | 6/2011 | Werden et al. | 455/456.1 |
| 8,150,367 B1 * | 4/2012 | Malladi et al. | 455/404.2 |
| 8,200,251 B2 | 6/2012 | Huang | |
| 8,634,359 B2 * | 1/2014 | Arslan et al. | 370/329 |
| 8,700,060 B2 | 4/2014 | Huang | |
| 9,140,776 B2 * | 9/2015 | Higgison et al. | |
| 2003/0008663 A1 * | 1/2003 | Stein et al. | 455/456 |
| 2005/0064877 A1 * | 3/2005 | Gum et al. | 455/456.1 |
| 2010/0093340 A1 * | 4/2010 | Buracchini | 455/426.1 |
| 2010/0324813 A1 | 12/2010 | Sundararajan et al. | |
| 2011/0018732 A1 | 1/2011 | Cho et al. | |
| 2011/0177831 A1 | 7/2011 | Huang | |
| 2011/0205125 A1 | 8/2011 | Lin et al. | |
| 2012/0133555 A1 | 5/2012 | Hyun | |
| 2012/0157123 A1 | 6/2012 | Li et al. | |

FOREIGN PATENT DOCUMENTS

| | | |
|---|---|---|
| WO | 2007/025159 | 3/2007 |
| WO | 2010/075369 | 7/2010 |
| WO | 2011/019917 | 2/2011 |
| WO | WO 2011/019917 | 2/2011 |
| WO | 2011/047310 | 4/2011 |
| WO | 2011/127659 | 10/2011 |
| WO | 2012/082828 | 6/2012 |

\* cited by examiner

METHOD OF AND SYSTEM FOR ESTIMATING POSITION

This application is the U.S. national phase of International Application No. PCT/GB2013/051222 filed 10 May 2013 which designated the U.S. and claims priority to GB Patent Application No. 1208407.5 filed 14 May 2012 and claims the benefit of U.S. Provisional Application No. 61/650,110 filed 22 May 2012, the entire contents of each of which are hereby incorporated by reference.

FIELD OF THE INVENTION

The invention relates to a method of, and system for, estimating the position of a user device, such as a mobile phone, personal data assistant, laptop computer, tablet computer. The invention also relates to a method of obtaining data concerning the location of offline regions and data for facilitating later positioning of a user device in the offline region.

BACKGROUND TO THE INVENTION

User devices, such as mobile phones, personal data assistants or tablet computers, may be required to know their position, for example, to operate navigation software and/or other location based services. Such user devices may comprise satellite position system (e.g. Global Positioning System (GPS)) receivers which are operable to receive data from a satellite which allows them to identify their position at any given time. However, satellite positioning systems typically require a line of sight between the satellite and the satellite positioning system receiver. When such a line of sight is unavailable, the user device may not be able to determine its position via satellite positioning.

In order to overcome this limitation of satellite positioning technology, a user device may be provided with alternative means for estimating its position, typically for use when satellite positioning is unavailable or inaccurate. For example, a user device may be capable of estimating its position using data measured from base stations of a cellular telephone network (e.g. 2G, 3G, 3.5G or 4G mobile communications network) together with a triangulation algorithm. Additionally or alternatively, a user device may be capable of estimating its position using data measured from a number of Wi-Fi access points together with data identifying the position of a plurality of said access points. Data identifying the absolute position of access points typically takes the form of a "map" of access point locations. The memory requirements of such a map may be prohibitively large for some user devices.

In order to avoid having to store large maps on the user device, it may be preferable for a user device to communicate with a central server to obtain the minimum amount of local positioning data required for determining its position at any given time. Alternatively, the user device may transmit data measured from the Wi-Fi access points it can "see" (i.e. within range of the user device) at any given time to a central server. In this case, the central server may have a memory (or access to a database) containing the positions of the Wi-Fi access points (or best estimates thereof), enabling it to determine the position of the user device when it has received the data measured from the access points. The central server may then transmit the determined position to the user device. This alternative technique also limits the amount of computation required at the user device to obtain an estimate of its position, saving battery power.

A disadvantage of employing a central server is that a working data communication channel must be available between the user device and the server for the positioning system to work.

Commonly, in areas (e.g. tunnels, shopping centres) where a user device cannot obtain access to a data communications network, the line of sight required to enable satellite positioning signal reception may also be unavailable. Accordingly, in these areas, neither positioning system may be operable. It is therefore desirable to develop a new positioning system which would allow a user device to obtain an accurate estimate of its position under these circumstances.

SUMMARY OF THE INVENTION

A first aspect of the invention provides a method of estimating the position of a user device, the user device being initially in electronic communication with a positioning system controller through a communication network (such as a 2G, 3G, 3.5G, 4G mobile communications network), the method comprising:

determining that a user device meets one or more proximity criteria with respect to an offline region where electronic communication between the user device and the positioning system controller, through the communication network, is expected to meet one or more failure criteria (e.g. the communications network is not sufficiently reliable, has excessive latency, insufficient bandwidth or similar) and responsive thereto and in advance of the user device entering the said offline region, the positioning system controller transmitting local positioning data to the user device, the local positioning data comprising data concerning one or more electromagnetic signal sources in the said offline region, and the user device subsequently estimating its position whilst it is within the offline region by measuring signal data from a plurality of electromagnetic signal sources and processing the measured signal data and the local positioning data.

By transmitting local positioning data to the user device prior to its entering the offline region, the user device has access to positioning data, which it otherwise would not have access to, which helps it to estimate its position within the offline region. In addition, because the local positioning data is transmitted to the user device in response to determination that a user meets one or more proximity criteria with respect to said offline region, it is ensured that the user device always has access to the local positioning data (if such local positioning data is available before the user device enters the offline region) when the user device is within the offline region. Transmitting the local positioning data to the user device in response to determination that a user meets one or more proximity criteria with respect to said offline region also ensures that the amount of data which needs to be sent to the user device for position estimation at any time when the user device has access to the positioning system controller via the communication network can be kept to a minimum (even when the user device calculates its own position from data received from the central server). This is because any need to compensate for the unexpected presence of offline regions by sending more local positioning data than immediately required is eliminated.

Preferably, the user device comprises a satellite positioning system receiver. However, even when the user device has a satellite positioning system receiver, the local positioning system data sent to the user device is still typically of value because a line of sight between the user device and a satellite (required for satellite communications) may also be unavailable within the offline region (or accuracy may be poor, especially in built up environments).

The local positioning data may further comprise data concerning one or more electromagnetic sources outside of (but typically adjacent to) the said offline region.

Typically, the local positioning data comprises data concerning a plurality of electromagnetic signal sources in the said offline region.

The failure criteria may be customisable, e.g. by a user. Alternatively, the failure criteria may be predetermined.

The proximity criteria may be customisable, e.g. by a user. Alternatively, the proximity criteria may be predetermined.

The positioning system controller typically comprises, or is in electronic communication with, a database of positioning data. The positioning data typically comprises data concerning the position of one or more electromagnetic signal sources. The positioning data may comprise data concerning the expected strength of signals received from electromagnetic signal sources at a plurality of positions within the offline region. For example, the positioning data may comprise data concerning the strength of signals expected to be received from one or more electromagnetic signal sources along one or more paths within the offline region.

The local positioning data may not comprise data specifying the location of electromagnetic signal sources within the offline region. It is advantageous to provide data specifying the expected strength of signals at a plurality of positions rather than the actual positions of electromagnetic signal sources as this reduces the computational burden on the user device and avoids the need to transfer potentially commercially sensitive data concerning the location of electromagnetic signal sources to the user device. Furthermore, it avoids the need to transmit algorithms to determine the position of a user device which require the position of electromagnetic signal sources to be transmitted to the user device. This enables different algorithms to be used to generate the local positioning data in different locations and for these algorithms to be updated without having to transmit revised algorithms to the user device.

Preferably, the local positioning data comprises a look up table which can be interrogated by the user device to determine its position, typically with reference to the measured signalling data. This helps to further minimise the computational burden on the user device.

In one embodiment, the local positioning data comprises data concerning identifiers of one or more electromagnetic signal sources and the strength of received signals expected from the respective one or more electromagnetic signal sources at each of a plurality of positions within the offline region. For example, the local positioning data may comprise one or more look-up-tables comprising data concerning expected signal power received from one or more respective signal sources at a plurality of positions within the offline region. The plurality of positions may comprise a plurality of positions along one or more paths within the offline region. Typically, the measured signalling data from the WAPs may be indexed (referenced) by an identifier of an electromagnetic signal source (e.g. its MAC address) or by position. This enables the measured signalling data from the WAPs to be cross referenced with the local positioning data. As indicated above, look-up tables are particularly efficient because they allow the computational burden on the user device to be minimised.

The step of estimating the position of the user device whilst it is within the offline region may comprise interpolating the local positioning data. This would typically be done by the user device, but may alternatively be done by the positioning controller.

The data concerning the strength of received signals expected from the respective one or more electromagnetic signal sources at each of a plurality of positions within the offline region may take the form of data specifying an expected variation in the received signal strength of one or more electromagnetic signal sources along one or more paths. Said data may comprise a plurality of power levels measured from one or more electromagnetic signal sources, each power level of a given electromagnetic source being associated with a different position. Said data may additionally or alternatively comprise one or more characteristics specifying an expected variation in the received signal strength of one or more electromagnetic signal sources along one or more paths.

In one embodiment, the method may further comprise the user device estimating the position of the user device as being located along a path selected from the said one or more paths at a position determined taking into account the said data specifying the expected variation in received signal strength along one or more paths and the measured signal data.

This is a particularly advantageous embodiment because although the local positioning data concerning the offline region may be sparsely detailed, it still typically allows the user device to obtain an improved estimate of its position within the offline region.

One skilled in the art will appreciate that the expected variation in received signal strength along one or more paths can be expressed in different ways. For example, the expected signal strength at a first location on the path and the change in expected (e.g. via one or more characteristics specifying an expected variation in) signal strength associated with movement along the path by a defined vector may be stored. Alternatively, data expressing the expected signal strength at each of first and second locations on the path may be stored. In each case, the position of the user device can be estimated by interpolation along the path taking into account the measured signal strengths.

Advantageously, the computation required by the user device to estimate its position is minimal in either case (particularly in the latter case).

In one embodiment, the method further comprises the step of generating data representing a path in response to detection that a user device has passed through an offline region from a first position to a second position, the path extending from the first position to the second position. Typically, the user device will have stored data concerning measurements of received signal strength from electromagnetic signal sources whilst it is within the offline region and this stored data can be processed to generate and/or improve the said data specifying the variation in expected received signal strength along one or more paths. This said path data may be generated by the user device but more preferably the data stored by the user device is subsequently transmitted to the positioning system controller, the path data being generated by positioning system controller.

As indicated above, defining such paths is particularly advantageous because, where the available data (e.g. from the database) concerning the offline region is initially sparse (or non-existent), it is possible to generate data representing one or more paths from the data returned to the positioning system controller by a low number of user devices which have passed through the offline region. Very quickly, data representing one or more paths within the offline region can be generated which is sufficiently detailed to facilitate positioning of other user devices subsequently entering the offline region. This data can be surprisingly accurate particularly because, in offline regions such as shopping centres or tunnels, a large number of users may follow similar paths.

The local positioning data may comprise data concerning the strength of received signals expected from an electromagnetic signal source at a plurality of positions within the offline region along each of a plurality of paths, wherein the plurality of paths form a network.

Such a network of paths allows the user device to more accurately estimate its position within an offline region than if, say, only a single path was provided.

In this case, within the offline region, the user device may follow its position through the network of paths, keeping track of which path most closely fits its position and using the measured signal strength data to determine which path of a plurality of paths meeting at a junction most closely fits the movement of the user device.

Preferably, the user device stores signal data concerning signals received from electromagnetic signal sources detected by the user device within the offline region before subsequently transmitting the stored signal data, or data derived therefrom, to the positioning system controller.

Typically, the stored signal data, or data derived therefrom, is transmitted to the positioning system controller after electronic communication with the positioning system controller through the communication network has resumed (i.e. when the user device has exited the offline region).

The positioning system controller preferably updates the database of positioning data in respect of the offline region in response to the said signal data received from the user device. Typically, the positioning system controller uses the said signal data received from the user device to update the database of positioning data in respect of the offline region.

Preferably, the method further comprises referencing the stored signal data, or data derived therefrom, which is transmitted to the positioning system controller to the time at which the respective signals were received by the user device.

In this case, the user device and/or positioning system controller preferably uses the time references to model the path that has been followed by the user device.

The positioning system controller may process the stored signal data, or data derived therefrom, which is transmitted to the positioning system controller by the user device, in batches, the contents of each of a plurality of said batches being determined at least partly by the time references allocated to the data.

It will be understood that references to time need not refer to absolute time but may be relative times, or indices in arbitrary units. For example, measurements taken at different times may simply be stored with reference to an integer which is incremented for each consecutive measurement. Where relative times are used, the server may "back process" the measurements received from the device (when it has left the offline region and transmitted data to the positioning system controller) and tag each measurement with an absolute time based on the measured relative times and a reference time. The reference time may be, for example, the absolute time at which the device entered the offline region.

The positioning system controller may store offline region data concerning said offline region. In this case, the method may further comprise logging where and when communication between the positioning system controller and the user device through the communication network meets one or more failure criteria and updating the stored offline region data accordingly. The logging may be carried out by the positioning system controller. Additionally or alternatively, the logging may be carried out by a communications device which transmits data to or receives data from the user device through the communication network. Additionally or alternatively, the logging may be carried out by the user device.

The offline region data may comprise data defining geographical regions (for example, defining polygons or zones in a grid or other configuration). The offline region data may comprise data concerning whether an electromagnetic signal source is detectable by a user device while the user device is in communication with the positioning system controller, and may therefore be as simple as a flag associated with each electromagnetic signal source. The offline region data concerning the area around an electromagnetic signal source from which an electromagnetic signal source is detectable by a user device while the user device is in communication with the positioning system controller.

Different offline region data may be provided for different communications networks. For example, it may be that users of different cellular telephone services have offline regions in different locations.

Additionally or alternatively, the offline regions may be identified by trigger signals output by the user device. For example, it may be determined that a user device meets the one or more proximity criteria with respect to an offline region where electronic communication by way of the communication network is expected to meet the one or more failure criteria responsive to a trigger signal generated by the user device. The trigger signal might be generated by the user device responsive to detecting that the signal strength of a bearer service for the communications network (e.g. a cellular telephone network signal strength) or the bandwidth of the communications network has dropped below a threshold, or that the latency of the communications network or a communication error rate has exceeded a threshold.

Preferably, an estimate of the speed or velocity at which the user device is moving may be transmitted to the user device before it enters an offline region. The measurement of speed or velocity can be used to estimate the position of the user device, for example by assuming that the device proceeds along a path (e.g. its current path) at the same speed or velocity. This may be useful to enable the user device to estimate its position while within the offline region. Additionally or alternatively, this may be useful to enable the positioning system controller to later (retrospectively) estimate the path followed by the user device within the offline region.

Preferably, the method further comprises the user device capturing additional position data. Such additional data can be used to assist the user device in estimating its position within the offline region. The captured data may be stored or temporarily logged by the user device and transmitted to the positioning system controller when the user exits the offline region. The captured data may then be stored by the positioning system controller. The positioning system controller may then send the captured data to the (or another) user device to help the (or another) user device estimate its position within the offline region, the captured data forming part of local positioning data which may be expected to be received by a user device at a particular position within the offline region.

For example, the user device may capture additional position data entered manually to the user device by a user. In one embodiment, the manually entered additional position data may comprise manual "check-in" data, which comprises an estimate of the position of the user device entered manually (e.g. by manually selecting a user interface element) by a user.

Additionally or alternatively, the additional position data may be captured by a sensor of the user device, such as a compass or accelerometer.

Preferably, the user device estimates its position whilst it is within the offline region using said additional position data (either alone or in combination with the local positioning data and/or measured data measured from the electromagnetic signal sources).

The user device may prioritise said additional position data over said local positioning data, and estimate its position whilst it is within the offline region using said additional position data without using said local positioning data in at least some circumstances. However, it will be understood that such additional sensing data may not always be available or it may not be sufficiently accurate.

Said additional position data may be transmitted from said user device to the positioning system controller, for example through the communication network when the user has exited the offline region. This additional position data may help the positioning controller to improve the quality of positional data in the database.

Accordingly, the method may further comprise the positioning system controller updating said local positioning data using the additional position data transmitted from said user device.

The step of updating said local positioning data may comprise updating data specifying an expected variation in received signal strength along one or more paths.

Typically, the method further comprises: determining that a subsequent user device meets one or more proximity criteria with respect to said offline region where electronic communication between the subsequent user device and the positioning system controller, through the communication network, is expected to meet one or more failure criteria and responsive thereto and in advance of the subsequent user device entering the said offline region, the positioning system controller transmitting updated local positioning data and/or some or all of said additional position sensing data to the subsequent user device, and the subsequent user device subsequently estimating its position whilst it is within the offline region by measuring signal data from a plurality of electromagnetic signal sources and processing the measured signal data, the updated local positioning data and/or the said some or all of said additional position sensing data.

The updated local positioning data typically comprises the original local positioning data which has been updated in accordance with the data transmitted to the positioning controller by an earlier user device. Thus, the updated local positioning data sent to the subsequent user device concerning the offline region may be more accurate than the original local positioning data employed by the earlier user device.

A plurality of user devices may employ the positioning system controller and receive the most up to date local positioning data available therefrom prior to entering an offline region. Additionally, a plurality of user devices may transmit signal data concerning the offline region back to the positioning system controller when they have exited the offline region to help improve the quality of positioning data in a database of positioning data accessible by the controller.

The local positioning data or updated local positioning data may comprise positioning data in three dimensions. For example, said local positioning data may comprise the identification of a floor of a building (typically together with a 2D position on that floor).

In one embodiment, where the local positioning data comprises one or more paths specifying an expected variation in received signal strength from one or more electromagnetic signal sources, one or more of said one or more paths may extend between two or more floors of a building.

This helps the user device to estimate its position in space in three dimensions, for example for operation of navigation software or other location based services.

A second aspect of the invention provides a system for estimating the position of a user device, the system comprising:
 a communication network;
 said user device;
 a positioning system controller initially in communication with said user device through said communication network; and
 one or more electromagnetic signal sources located in an offline region where electronic communication between the user device and the positioning system controller, through the communications network, is expected to meet one or more failure criteria;
wherein the positioning system controller is configured to determine that said user device meets one or more proximity criteria with respect to said offline region and, in response thereto, the positioning system controller is configured to transmit local positioning data to the user device, the local positioning data comprising data concerning one or more of said electromagnetic signal sources in the said offline region, and wherein the user device is configured to estimate its position whilst it is within the offline region by measuring signal data from one or more said electromagnetic signal sources and by processing the measured signal data and the local positioning data.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
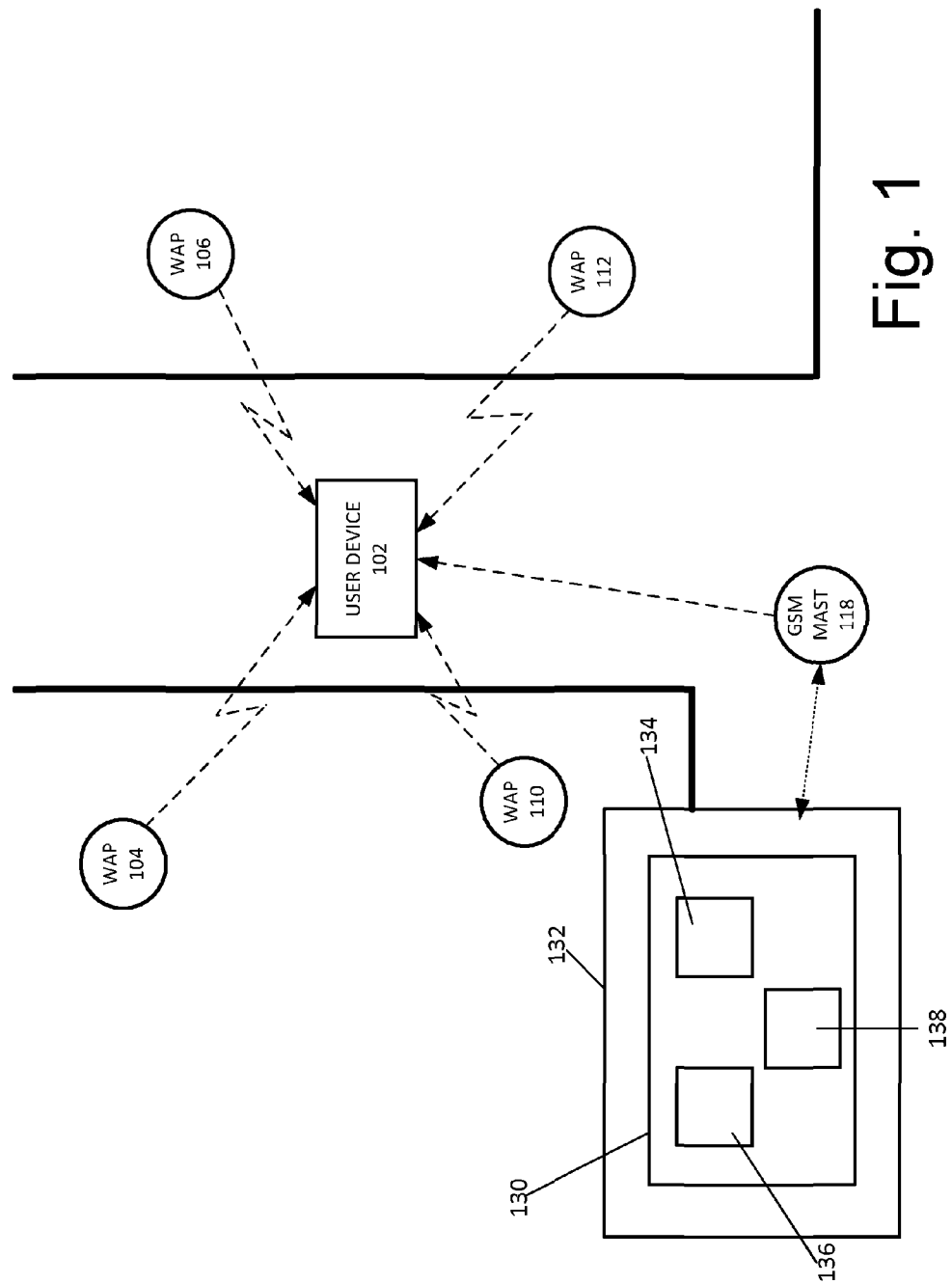
FIG. 1 is a block diagram illustrating a user device in communication with a mobile data communications base station and a plurality of Wireless Access Points.
Figure 2:
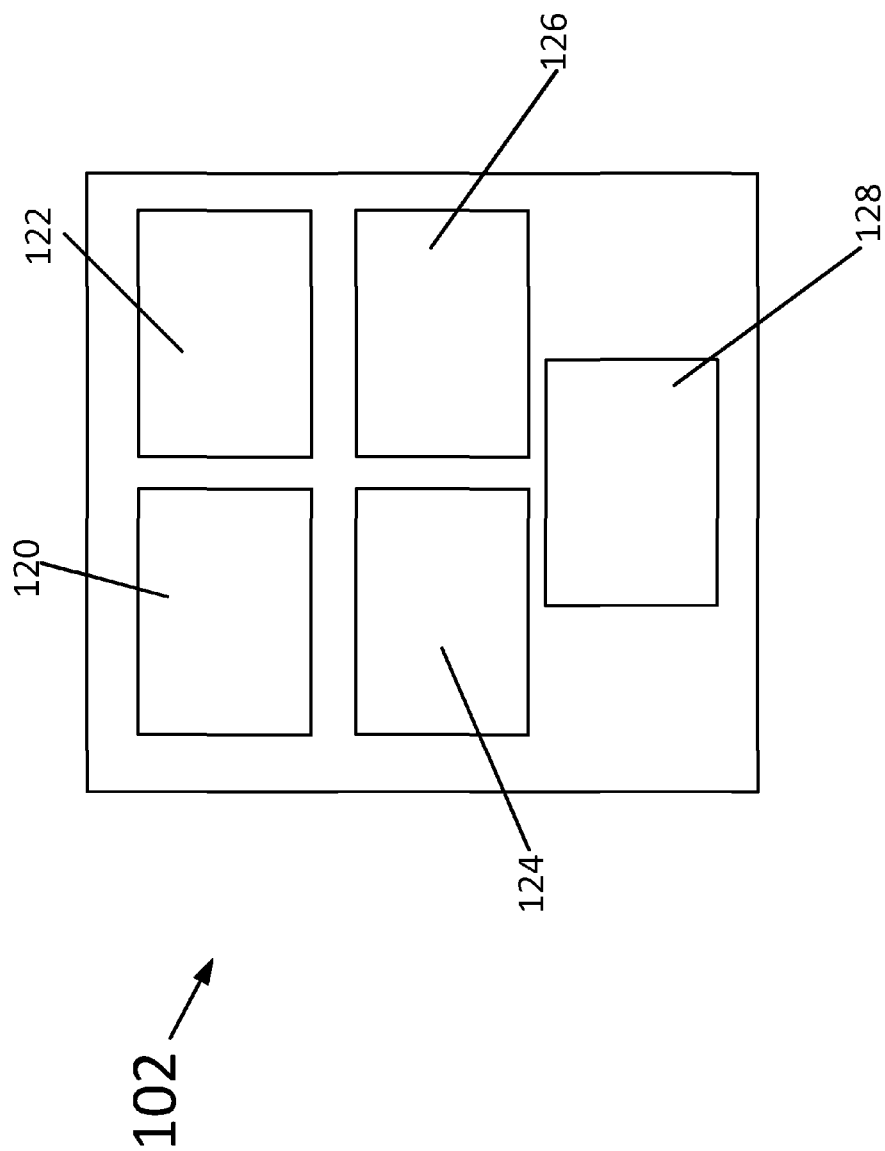
FIG. 2 is a block diagram illustrating the features of an exemplary user device of FIG. 1.

FIG. 1 is a schematic diagram of a user device 102 in data communication with a mobile data communications (e.g. GSM) base station 118 (which is in turn connected to, and forms part of, an electronic data communications network) and four wireless access points (WAPs) 104, 106, 110, 112 operating in accordance with the Wi-Fi standard. User device 102 is typically portable and may be, for example but not exclusively, a mobile (smart)phone, tablet computer, personal data assistant or laptop computer. In the following description, and as illustrated in FIG. 2, it will be assumed that user device 102 is a mobile smartphone comprising at least: a Global Positioning System (GPS) receiver 120, a Wi-Fi transceiver 122, a data communications transceiver 124 (operating according to the same standard as base station 118), a local memory 126 and a processor 128. However, it will be understood that the user device 102 will typically further comprise various other components (e.g. a battery, digital camera etc). It will also be understood that any suitable satellite positioning system receiver may be used in place of the GPS receiver 120 (such as a receiver operable to receive and process signals received from Galileo, Compass or GLONASS satellites).

A positioning system controller 130 is provided at a central server 132 which is in data communication with the base station 118 through the data communications network. The controller 130 comprises a data transceiver 134, a processor 136 and a local memory 138. The local memory 138 stores a positioning database comprising positioning data concerning WAPs 104-112. The positioning data can be used for identifying the position of the user device 102, in combination with signalling data measured from one or more of the WAPs 104-112 by the user device 102 at any given position (within range of the WAPs 104-112). The positioning data may include, for example but not exclusively: absolute or relative positions of WAPs 104-112; fingerprint data which links WAP identification and expected received power data with certain positions in space (typically along one or more paths); or characteristics which specify an expected variation in the power detected from one or more WAPs 104-112 along one or more paths. This will be explained in more detail below.

Other useful information concerning the WAPs 104-112 may be stored in the positioning database of the controller 130, such as their MAC addresses, transmitted signal powers, types and model.

The features of the controller may alternatively be distributed. For example, the positioning database may be remote from the processor 136, but accessible to the processor 136 for example through the data communications network.

Figure 3:
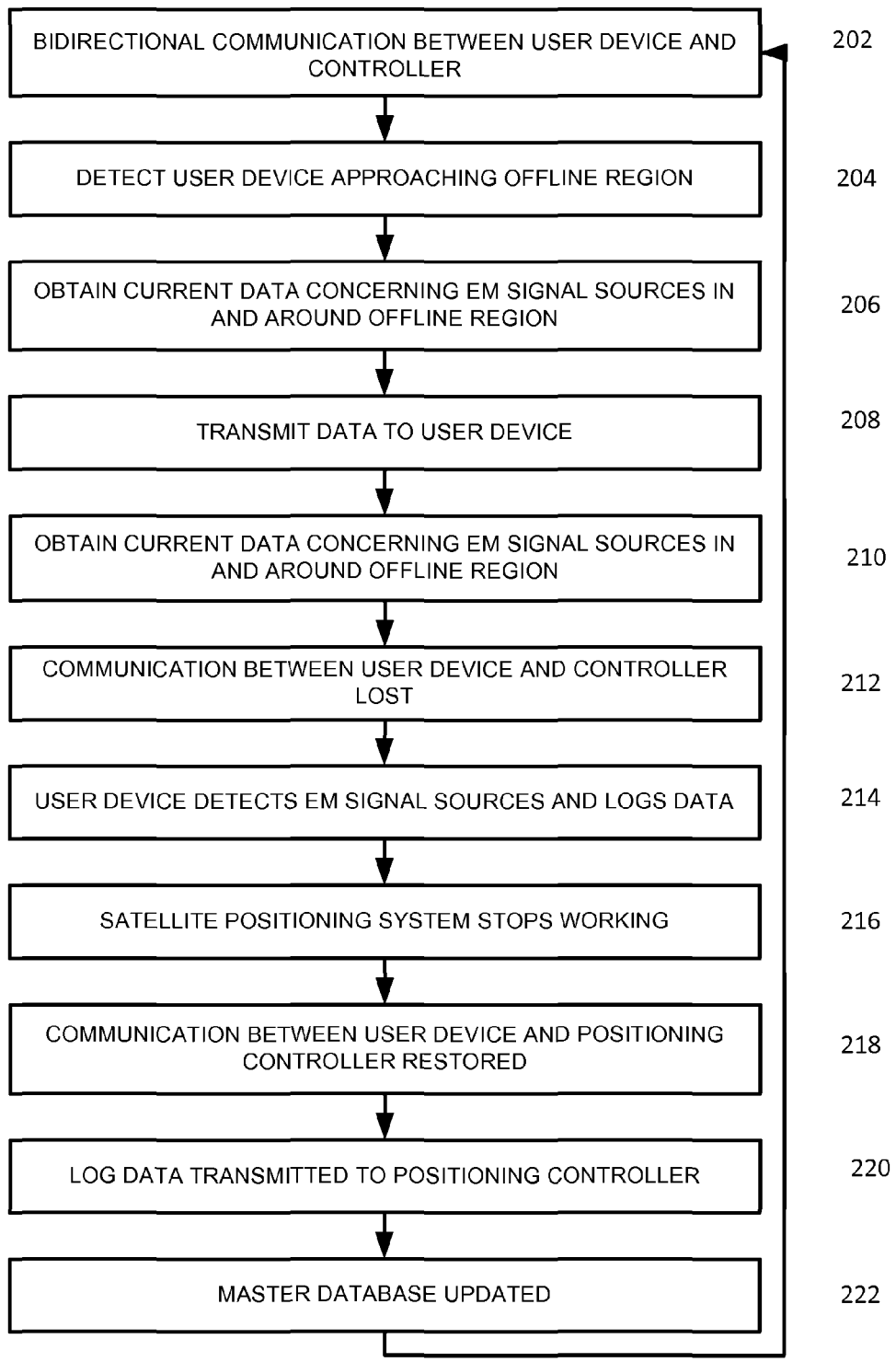
FIG. 3 is a flow-chart illustrating a method of estimating the position of the user device.

The flow chart of FIG. 3 illustrates a method of estimating the position of the user device 102.

Before the steps 202-222 of the method of FIG. 3 are described in detail, it is noted that, where a line of sight is available between the user device 102 and a GPS satellite (not shown), the user device 102 may obtain an estimate of its own position by processing GPS data received from the GPS satellite by the GPS receiver 120.

Where such a line of sight is unavailable, the position of the user device 102 may need to be determined using data received from the WAPs 104-112, together with information from the database stored in the controller memory 138. As explained below, this determination of the position of the user device 102 may be performed at either the user device 102 or at the controller 130 (which subsequently transmits the determined position of the user device 102 to the user device 102). It will be understood that the user device 102 typically detects and logs measured data from the WAPs 104-112 that are in range of the user device 102, even when GPS is available.

Figure 4:
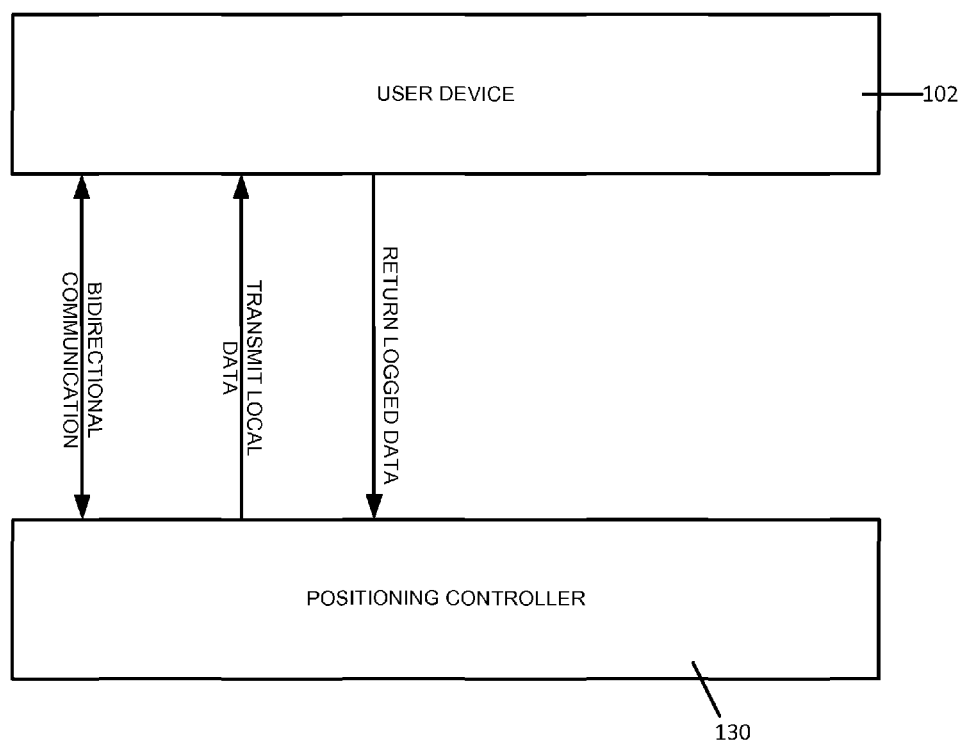
FIG. 4 is a block diagram illustrating the bidirectional communication between the user device and a positioning controller.

At a first step 202 of the method of FIG. 3, bidirectional communication may be performed between the device 102 and the controller 130. This typically occurs whether or not GPS is available, for example to determine when the user device 102 is approaching (and/or near) an offline region. An offline region exists where communication between the device 102 and the controller, through the communication network, meets one or more failure criteria (such as insufficient reliability, excessive latency, insufficient bandwidth or similar). Said bidirectional communication may also be employed to update positioning information in the database stored at memory 138 of the controller 130 using (e.g. GPS and/or WAP) data gathered by the user device 102, as illustrated in FIG. 4. This is explained in more detail later.

Typically, each WAP 104-112 transmits data such as its MAC address, transmitted signal power (although, where the transmitted signal power is not comprised in the signalling data transmitted by one or more WAPs, the transmitted signal power may alternatively be measured or inferred from one or more signal powers received from the respective one or more WAPs when the position of the one or more WAPs is known and the user device's position is known, for example via GPS), type and model, which is detected by the Wi-Fi transceiver 122 of the user device 102 and logged in memory 126. The signal power received from each WAP 104-112 by the user device 102 at a given position (which is typically attenuated with respect to the transmitted signal power) is also typically recorded in memory 126.

When the data communication network is available between the user device 102 and the controller 130, the user device 102 may be configured to calculate its own position. In this case, the user device 102 may transmit a request to the positioning controller 130 for positioning data relating to the detected WAPs 104-112. The positioning controller 130 may then transmit the requested data back to the user device 102, which processes positioning data together with the data measured from the WAPs 104-112 to determine its own position. Alternatively, the controller 130 may be used to calculate the position of the user device 102. In this case, the user device 102 may transmit the data measured from each WAP 104-112 (typically including the received signal power from each WAP) to the positioning controller 130 which may process the measured data, together with positioning data stored in its memory 138 relating to the detected WAPs, to determine the position of the user device 102. The determined position may then be sent to the user device 102 by the transceiver 134 of the controller 130. The latter method is preferable because it typically requires less data to be stored at, and less processing (and thus battery) power to be expended by, the user device 102.

Both of the methods described above for determining the position of the user device 102 without using GPS data require a data communication channel to be present between the user device 102 and the positioning controller 130. Therefore, in offline regions (e.g. tunnels, shopping centres) where the one or more failure criteria are met, these methods cannot be employed in their current form.

Figure 5:
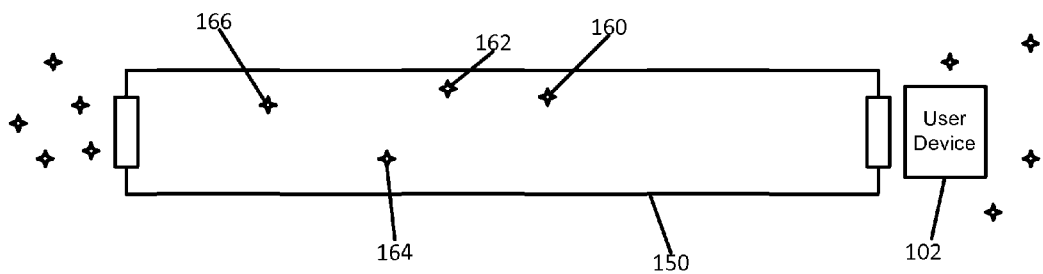
FIG. 5 is a schematic diagram illustrating a user device approaching an offline region where the data communication network between the user device and the positioning controller is compromised.

In a second step 204, the controller 130 detects that the user device 102 meets one or more proximity criteria with respect to an offline region 150 (e.g. the user device 102 is within a predetermined radius of the offline region and/or is approaching or moving towards the offline region). An exemplary offline region 150 is shown in FIG. 5.

Typically, the positioning system controller 130 stores data identifying the location of the offline region 150 (and other offline regions 150) in memory 138. This offline region location identification data may have been obtained by, for example, monitoring where communication between the user device 102 (or one or more other user devices 102) and the controller 130 has (have) through the communication network previously met the one or more failure criteria of the offline region and/or where full communication between the user device 102 and the controller 130 through the data communications network has been re-established (where for example none of, or not all of, the one or more failure criteria are met). As the current position of the user device 102 is typically readily available when it is not in offline region 150 (e.g. by GPS or any other suitable method), the positioning system controller 130 and/or the user device 102 are typically operable to identify when the user device 102 meets the one or more proximity criteria with respect to the offline region (see above).

Additionally or alternatively, the controller 130 may determine that a user device 102 meets the one or more proximity criteria with respect to the offline region 150 in response to a trigger signal generated by the user device 102. The trigger signal may for example be generated by the user device 102 responsive to detecting that the signal strength of a bearer service for the communications network or the bandwidth of the communications network has dropped below a threshold, or that the latency of the communications network or a communication error rate has exceeded a threshold.

In third step 206, the positioning system controller 130 obtains the most up to date local positioning data available from the positioning database stored in memory 138 concerning the WAPs 160, 162, 164, 166 (and/or other electromagnetic signal sources) located in and around the offline region 150. In a fourth step 208, the controller 130 transmits this local positioning data to the user device 102 in advance of the user device 102 entering the offline region 150.

At step 210, the user device receives the local positioning data transmitted by the controller 130.

In a next step 212, the user device 102 enters the offline region 150 and communication between the user device 102 and base station 118 through the communications network meets the one or more failure criteria of the offline region. At this stage, the GPS receiver 120 may still have a line of sight with the GPS satellite. In this case, the user device 102 will continue to receive and process GPS data from the satellite, and continue to determine its own position using the GPS data. In addition, the user device 102 will measure and log data detected from the WAPs 160-166. This is represented as a next step 214 in FIG. 3.

In step 216, as the user device 102 moves further into the offline region 150, its line of sight with the GPS satellite may be lost. In this case, the user device 102 can no longer determine its own position by GPS. At this point, the user device 102 may estimate its position whilst it is within the offline region 150 by processing the measured signal data from WAPs 160-166 together with the local positioning data received from the positioning system controller 130. This is explained in more detail below.

The local positioning data sent to the user device 102 by the controller 130 in advance of the user device 102 entering the offline region 150 may comprise estimates of (or the actual) positions of the WAPs 160-166. In this case, the user device 102 may calculate its distance from each of the detected WAPs by using the following formula with respect to each WAP:

$$P_r = \frac{P_t G_t G_r \lambda^2}{(4\pi)^2 d^2} \quad (1)$$

where $P_r$ is the received signal power at the user device 102, $P_t$ is the transmitted power of the WAP, $G_r$ and $G_t$ are the receiver and transmitter gains respectively, $\lambda$ is the signal wavelength and d is a distance between source and receiver.

This function may alternatively be expressed in terms of propagation gain (PG) as:

$$PG = \frac{P_r}{P_t G_t G_r} = \frac{\lambda^2}{(4\pi)^2 d^2} \quad (2)$$

and in decibels form as:

$$PG_{dB} = 20 \log(\lambda/4\pi d) \quad (3)$$

Typically, all of the parameters of the above equations, apart from distance, d, are known to the user device 102 either from the data measured from the WAPs 160-166 or from the local positioning data received from the controller 130. Accordingly, the user device 102 may determine its distance, d, from a given WAP using the above equation.

The above equation is useful for a free space environment, but may not be sufficiently accurate for use in "real world" indoor environments such as tunnels or shopping centres. An alternative equation for use in such indoor environments may be:

$$PG_{dB} = 20 \log(\lambda/4\pi d_0) + 10n \log(d/d_0) + X_\sigma \quad (4)$$

where X, n and $d_0$ are parameters which vary with different indoor environments and which can be determined empirically.

By processing the known positions of WAPs together with the distances calculated from each WAP, the position of the user device 102 can be estimated by, for example, triangulation.

More preferably, the local positioning data sent to the user device 102 by the controller 130 comprises fingerprint data which links WAP identification and expected received power data with certain positions in space. More specifically, the fingerprint data may, for example, comprise a map of grid points, each grid point representing a position, and each grid point being associated with one or more parameters (e.g. received signal power) of one or more of the WAPs 160-166. As an example, notional grid point A on the map of grid points may be associated with a received signal power of −30 dBm from WAP 160 and a received signal power of −50 dBm from WAP 162. Accordingly, when user device 102 receives a signal power of −30 dBm from WAP 160 and a signal power of −50 dBm from WAP 162, the user device 102 may compare this measured signal data with the map of grid points (local positioning data) and determine that the user device 102 is currently at grid point A. The position associated with grid point A can also be obtained from the map.

More typically, the grid may be more sparsely detailed, in which case, rather than including a high resolution grid with closely spaced points representing a large number of positions within the offline region, the grid may only comprise grid points along one or more paths within the offline region 150. In this case, the estimated position of the user device 102 may be approximated to (or "snapped to") a particular path through the offline region 150 at a position which best fits the data measured from the WAPs 160-166.

The path data may instead comprise characteristic data specifying an expected variation in received signal power from one, some or each WAP 160-166 along one or more paths within the offline region 150. In this case, the user device 102 may estimate its position as being located along a path selected from the one or more paths at a position determined by processing the local positioning data received from the controller 130 together with the data measured from the WAPs 160-166 and determining which position along the path best fits the processed data. Typically, an initial position of the user device 102, such as the position at which it entered the offline region or a previously determined position within the offline region 150, may need to be used in combination with the characteristic data to determine the current position of the user device 102.

Paths may be employed to decrease the computational burden on the user device 102, for example by providing the fingerprint or characteristic data as part of a look-up table which can be readily interrogated by the user device 102. Paths may also provide useful approximations where, for example, the local positioning data is insufficiently detailed to enable the user device 102 to determine its position to a higher degree of accuracy.

Figure 6:
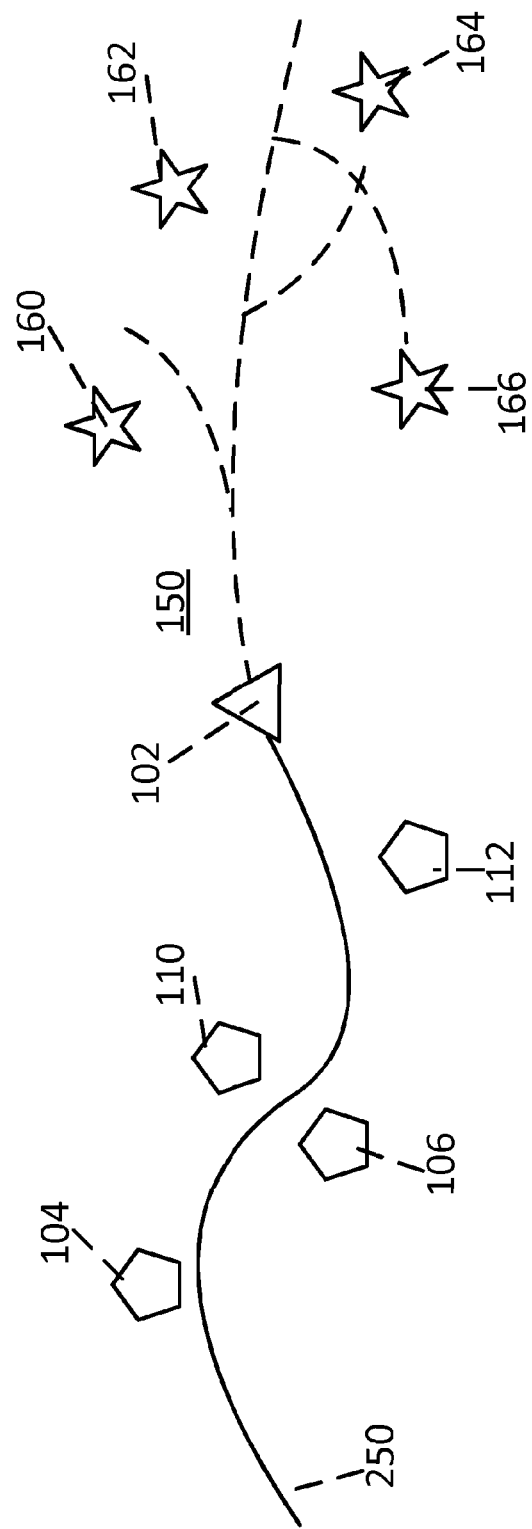
FIG. 6 is a schematic diagram representing local positioning data comprising a plurality of paths specifying variations in expected received power from one or more WAPs along particular routes within the offline region.

FIG. 6 illustrates a situation where the local positioning data received by user device 102 from the positioning controller 130 comprises four paths, each path being composed of fingerprint data associated with particular positions within the offline region 150 and/or characteristic data specifying an expected variation in received signal power from one or more WAPs 160-166 along a particular route within the offline region. The user device 102 has followed a path 250 outside of the offline region 150, typically logging data received from a GPS satellite and the WAPs 104, 106, 110 and 112 located proximate the path 250 and processing the received data (and/or sending it to the controller 130 over the communications network) to determine its position.

As explained above, once within the offline region 150, the user device 102 measures data from nearby WAPs 160-166, and processes the received data together with the local positioning data received from the controller 130, to determine its position. An exemplary method of estimating the position of a user device 102, where the local positioning data contains one or more paths each composed of data specifying an expected variation in received signal power from one or more WAPs, is illustrated by the flow-chart of FIG. 7, and is explained below.

Figure 7:
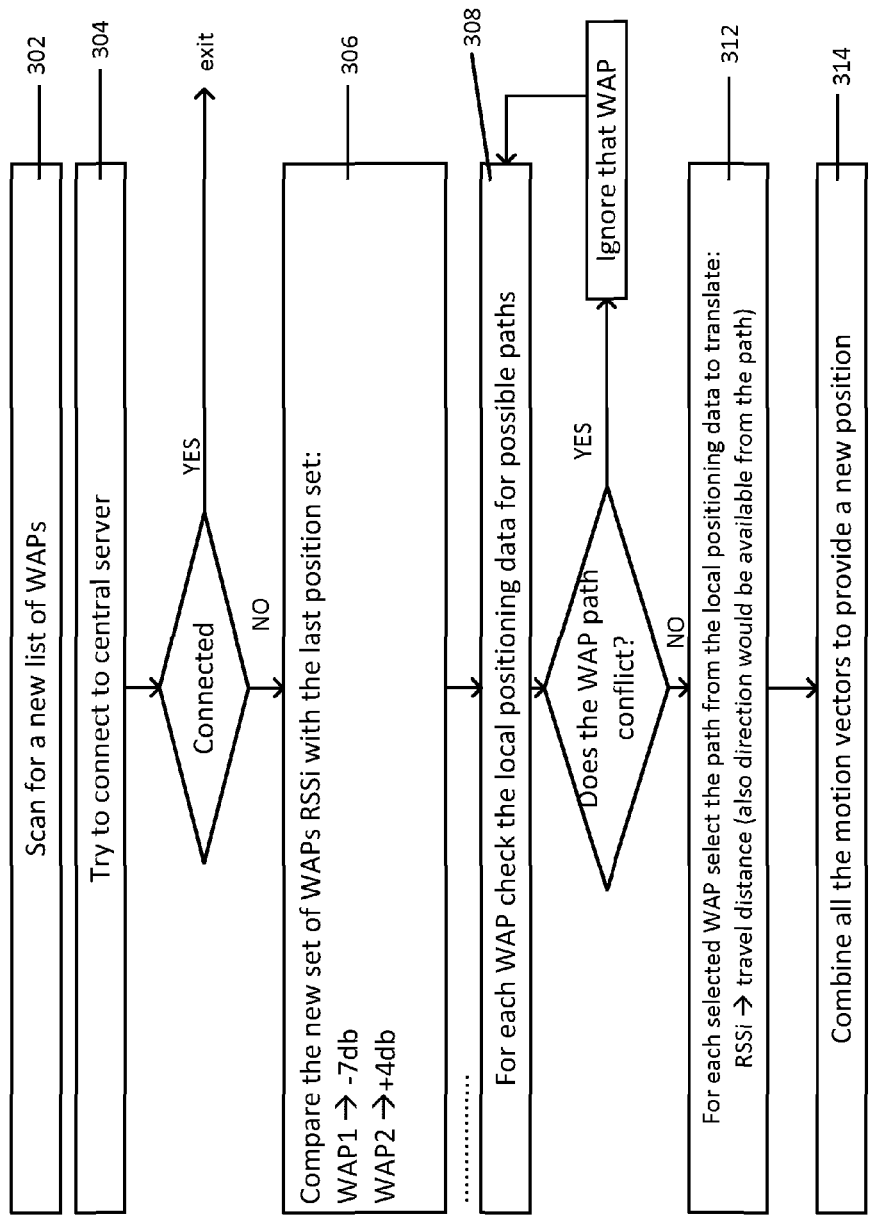
FIG. 7 is a flow diagram illustrating a method of estimating a user's position within an offline region.

As indicated above with respect to FIG. 3, before first step 302 of FIG. 7, the user device will have detected (or been instructed by the central server 132) that it meets the one or more proximity criteria with respect to an offline region 150, and the controller 130 will have sent the user device 102 local positioning information concerning the WAPs 160-166 in the offline region 150 in response thereto. It will also be understood that, before first step 302, the user device 102 will have determined that no line of sight is available for GPS to be used.

At first step 302, the user device 102 scans for a list of the WAPs 160-166 within its range of detection. In a second step 304, the user device 102 attempts to connect to the central server 132 to determine whether a connection is available. Because the user device 102 is in the offline region, no connection is available via the data communication network. Accordingly, the user device 102 must rely on the local positioning data received from the controller 130 before entering the offline region 150 to determine its position.

At a third step 306, the received power from the detected WAPs 160-166 may be compared with the power received from WAPs 160-166 the last time step 302 was performed (which may have been within or outside of the offline region 150). For example, it may be determined that the power received from a first WAP 160 is 7 dB less than the power received from the first WAP 160 the last time the first step 302 was performed, that the power received from a second WAP 162 is 4 dB greater than the signal power received from the second WAP 162 the last time the first step 302 was performed, and so on. If the power received from a WAP is increasing, it may be assumed that the user device 102 is moving closer to the WAP, whereas if the power received from a WAP is decreasing, it may be assumed that the user is moving away from the WAP (although it will be understood that this may not always be correct). It will be understood that, if an additional sensor such as a compass is provided onboard the user device 102, directional information from the compass may additionally or alternatively be used by the user device 102 to estimate which direction it is travelling along a given path (see below). Other potential sensors which may be present onboard the user device 102 include an altimeter, an accelerometer and so forth.

In a fourth step 308, the local positioning data (received from the controller 130 before the user device 102 entered the offline region 150) is interrogated for all of the paths associated with each WAP 160-166 detected in step 302. As indicated above, the local positioning data may be provided to the user device 102 by the controller 130 in the form of a look-up-table to enable the user device 102 to estimate its position without heavy computation. In one embodiment, each path in the local positioning data may have been divided into path segments, each path segment having a linear function associated with it which estimates a linear change in expected received signal power from one or (preferably) more WAPs along that path segment per unit distance. Such look-up tables may only be generated by the controller 130 when it detects that the user device is about to enter an offline region 150 or they may be generated in advance. Alternatively, the distance of a user device 102 from each WAP in the offline region may be calculated from one or more equations, such as equations (1)-(4) provided above. However, it will be understood that using these equations would be less desirable than using a look-up-table due to the increase in processing required by the user device 102.

Each path (and, where the paths are divided into segments, each of the possible path segments) associated with each WAP 160-166 is compared to the results of step 306 and the paths which are inconsistent with that comparison are eliminated from consideration. If all of the remaining paths associated with a particular WAP conflict with the remaining paths associated with the other detected WAPs, that particular WAP is discarded at a fifth step 310 and ignored in the subsequent determination of the position of the user device 102. The remaining paths (or path segments) will be compatible with each other; indeed only one path (or one path segment) may remain under consideration at this stage.

In a sixth step 312, for each remaining path (segment), the received signal power (logged at step 302) from each WAP associated with that path is translated into travel distance using the characteristic(s) provided in the local positioning data. The direction along the selected path (e.g. whether the user device 102 is moving towards or away from a given WAP) is known from the comparison performed in step 306 (and/or from additional sensing data). The direction and distance data are then combined to provide a motion vector in respect of the user device 102 for each WAP.

At a final, seventh step 314, the motion vectors calculated for each WAP are combined to derive an estimation of the position of the user device 102.

Figure 8:
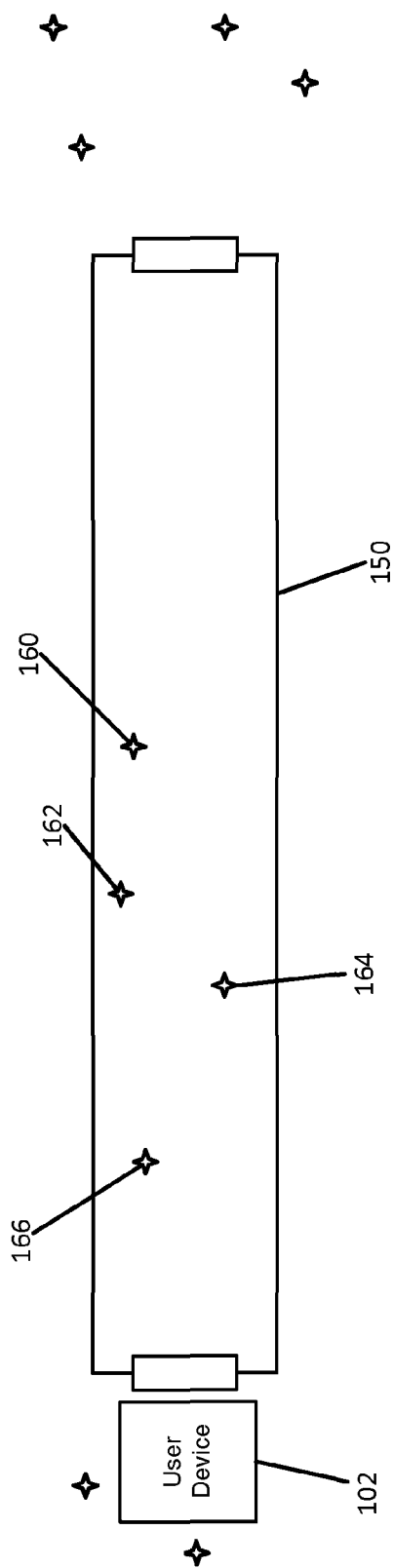
FIG. 8 illustrates a user device exiting the offline region of FIG. 5.

The process may then be repeated until the connection between the user device 102 and the controller 130 has been re-established (indicating that the user has left the offline region 150—see FIG. 8), in which case the process flow of FIG. 7 is exited following step 304 (and before step 306). Position estimation using either GPS (if available), or other satellite positioning system, or via contact with the controller 130 can then be resumed.

In addition to the above techniques, the user device 102 may employ time and/or speed information to assist in the estimation of its position. For example, each measurement of WAP data may be time referenced to the time at which it was received by the user device 102. In this way, the time between successive WAP data measurements can be determined by the user device 102 in order to assist the user device 102 to estimate its position. Additionally or alternatively, an average (or current) speed of movement of the user device 102 may be included in the local positioning data sent to the user device 102 by the controller 130 before it has entered the offline region 150. For example, the rate of change of received signal power from WAPs 160-166 with relative distance can be measured by the user device 102 and compared to the local positioning data (e.g. where the local positioning data comprises one or more characteristics estimating the rate of change of signal power with distance) to assist in the estimation of user device position.

Additionally or alternatively, the user device 102 may comprise an additional sensor such as an accelerometer to enable it to calculate the number of steps taken by a user carrying the user device 102 within the offline region 150. An estimate of distance per step may be predetermined, entered manually by the user or measured by the user device 102. Additionally or alternatively, the accelerometer may provide data from which an estimate of the speed being travelled by the user device 102 can be derived. It will be appreciated by the person skilled in the art that this information can be used by the user device 102 to assist in estimating its position.

As indicated above, other additional sensors (such as a compass or altimeter) may be provided on the user device 102 to help it estimate its own position, and data captured by these additional sensors may be used by the user device 102 within the offline region 150, typically in combination with the local positioning data sent to the user device 102 by the positioning system controller 130, to help the user device 102 to estimate its position. For example, one or more paths comprised in the local positioning data may comprise directional information (e.g. a heading expressed as a compass bearing or as a vector). In this example, for a user device 102 to be located on such a path, data received from a compass onboard the user device 102 must match (within a given error) the directional information provided in the path data. Additionally or alternatively, the direction information provided by the compass onboard the user device 102 can be used by the user device 102 to select a path from a plurality of potential paths comprised in the local positioning data along which the user device 102 is estimated to be travelling. Accordingly, additional sensor data (in this case from a compass) can be used in combination with the local positioning data by a user device 102 to determine its position along a path.

Additionally or alternatively, the user device 102 may be capable of receiving a manual input from a user. For example, a user may manually "check-in" by entering an estimate of his/her current position to the user device 102 when the device 102 is in the offline region 150. As above, this information may be used by the user device 102 to select a path from a plurality of potential paths comprised in the local positioning data along which the user device 102 is estimated to be travelling. Alternatively, this information may be used by the user device 102 to estimate how far along a given path a user device 102 is estimated to have travelled at any given time.

It will be understood that a manual "check-in" may additionally or alternatively be performed outside of the offline region 150.

The user device 102 can thus use such additionally captured position data to obtain a more accurate estimate of its position, particularly when the user device 102 is within the offline region 150. In some cases, the user device 102 may be operable to prioritise the additional position data obtained by the additional sensors (or received from a manual user input) over the combination of the local positioning data transmitted by the controller 130 prior to entering the offline region 150 and the measured data from the WAPs 160-166 in order to estimate its position. In some cases, the user device may even estimate its position whilst it is within the offline region using the captured position data from the additional sensors/manual input without using the local positioning data transmitted to the user device 102 by the controller 130 and/or the measured signalling data from the WAPs 160-166. For example, an accelerometer onboard user device 102 may indicate the number of steps taken (and thus the distance travelled, making an estimate for the distance per step) by a user and a compass onboard user device 102 may indicate the direction in which the user is travelling. This allows a motion vector to be derived. By combining a previously known position (e.g. outside of the offline region) with this motion vector, the user device 102 can obtain an estimate of its position. It will be appreciated, however, that such additional position data may not always be available. In addition, the additional sensing data may be less reliable over time than the combination of the local positioning data and the measured data from WAPs 160-166, particularly when the local positioning data has a high degree of accuracy.

It will be understood that any two or more of the above examples of local positioning data may be combined, where possible, to improve the ability of the user device 102 to estimate its position.

The local positioning data may be interpolated by the user device when estimating its position.

It will also be understood that the position of the user device 102 may be determined retrospectively by the controller 130. For example, the signal data measured by the user device 102 from the WAPs 160-166 (together with time reference data where available) may be transmitted to the controller 130 following the exit of the user device 102 from the offline region 150 (and the communication network is available). The controller 130 may have logged the time, speed and/or velocity at which the user device 102 entered and exited the offline region for use in the retrospective calculation of the position of the user device 102. The position of the user device 102 may be transmitted to the user device 102 following its determination by the controller 130.

As explained below, the positioning system controller 130 may also use data transmitted to it from the user device 102 when it has left the offline region 150 to determine and/or improve the local positioning data stored in the database concerning the offline region 150.

Determining/Improving Local Positioning Data Concerning Offline Regions

Initially, offline regions 150 may be identified by existing data in the database of the positioning system controller 130. Alternatively, one or more offline regions 150 may not initially be known to the positioning system controller 130—i.e. the offline region(s) may comprise "virgin territory". In this case, no local positioning data may be sent to the user device 102 before it enters the offline region 150 as it is initially unavailable. Rather, the positioning system controller 130 will simply detect that its connection with user device 102 through the communication network has met the failure criteria. The positioning system controller 130 may determine the locations of offline regions 150 by monitoring areas where the user device 102 (and/or other such user devices) is (are) unable to communicate with it via the communications network. The location of an offline region 150 may then be used by the positioning system controller 130 in order to determine when to transmit local positioning data concerning that offline region 150 to a user device 102 (i.e. when the user device 102 meets the one or more proximity criteria with respect to that offline region 150).

The controller 130 may also store initial local positioning data concerning one or more WAPs within the offline region(s) (e.g. the or estimates of the positions of the WAPs present in the offline region 150). This initial local positioning data may have been detected by a user device 102 when it was outside of the offline region 150 and transmitted to the controller 130 for storage in memory 138 and processing by processor 136. Initial positioning data may additionally or alternatively have been detected by a previously performed systematic survey such as "war-driving" or "war-walking" or by the procedure described in WO 2011/077166 (Arslan et al.). Such previously performed systematic surveys may also be used to identify locations of offline regions 150.

Where satellite positioning is available to the user device 102 within an offline region 150, the user device 102 may determine and log its own position whilst it is within the offline region 150. In addition, the user device 102 will measure and log data detected from WAPs (referred to below as "WAP measurement data") within the offline region 150. The user device 102 may associate the WAP measurement data measured at a particular location within the offline region 150 with the corresponding satellite positioning data measured at that point (and/or with the position determined from that satellite positioning data). For example, the WAP measurement data and satellite positioning data may be time referenced, the WAP measurement data and satellite positioning data having the most closely matching time references thus being associated with each other. When the user device 102 leaves the offline region 150, the communication between the user device 102 and the positioning system controller 130 may be restored (illustrated by step 218 of FIG. 3), and the WAP measurement data and satellite positioning data may be transmitted to the positioning system controller 130 by the user device 102 (illustrated by step 220 of FIG. 3).

The WAP measurement data transmitted to the local positioning controller may take the form of a table comprising WAP identification data (e.g. MAC addresses) and received signal strengths from WAPs detected at a plurality of positions and times within the offline region as shown below:

| Position Number | Mac address | RSSi | Time Stamp |
|---|---|---|---|
| 1 | Mac 1 | −98 | 13457885453 |
| 1 | Mac 2 | −79 | 13457885453 |
| 1 | Mac 4 | −81 | 13457885453 |
| 2 | Mac 2 | −72 | 13457885463 |
| 2 | Mac 3 | −91 | 13457885463 |
| 2 | Mac 4 | −80 | 13457885463 |
| ... | ... | ... | ... |

In the example provided in the table above, at a first position, the user device 102 detects three WAPs having MAC addresses Mac 1, Mac 2 and Mac 4 having Received Signal Strengths (RSSi) of −98, −79 and −81 dBm respectively. As these three WAPs were detected at the first position at the same time, they are all allocated the same time stamp. At a second position, the user device 102 detects three WAPs having MAC addresses Mac 2, Mac 3 and Mac 4 and having received signal strengths of −72, −91 and −80 dBm respectively. As these three WAPs were detected at the second position at the same time, they are all allocated the same time stamp (which is different from the time stamp associated with the first position). Between the first and second positions, Mac 1 has fallen out of range of the user device 102, while Mac 3 has come into range of detection of the user device 102.

The satellite positioning data may be provided together with the above table, or separately.

The positioning system controller 130 may then process the WAP and satellite data to generate a path through the offline region 150 based on the received WAP data and positional information derived from the satellite data. For example, typically after storing the WAP measurement data and the satellite positioning data received from the user device 102, the positioning system controller 130 may generate one or more characteristics representing the rate of change of signal power which would be expected to be received from one or more WAPs along a specific path within the offline region 150. This path data may then be made available to other user devices 102, including user devices 102 which may not have satellite positioning capabilities, to enable them to estimate their position within an offline region.

Where satellite positioning (e.g. GPS) is unavailable to the user device 102 within an offline region 150, the user device 102 may determine and log its own position while it is within the offline region 150 using the positions of one or more WAPs within the offline region 150 provided within local positioning data together with the WAP measurement data. As above, while the user device 102 is within the offline region 150, it measures and logs WAP measurement data from WAPs within range while it is in the offline region 150. Preferably, the WAP measurement data is time referenced. Optionally, the WAP measurement data may be associated with the position derived therefrom (using the WAP position data comprised in the local positioning data received from the positioning system controller 130) by the user device 102, e.g. by time referencing the derived position with the time reference applied to the WAP measurement data from which the position was derived. When the user device 102 leaves the offline region 150, the WAP measurement data is transmitted to the positioning system controller 130 by the user device 102 as above, optionally together with the position data derived from it by the user device 102. The positioning system controller 130 may then process the received data to generate a path through the offline region 150 based on the WAP measurement data and position data derived from the WAP measurement data. For example, the controller may draw a straight line path from the position where communication through the communication network between the user device 102 and the positioning system controller 130 met the failure criteria, and the position where communication through the communication network between the user device 102 and the positioning system controller 130 was fully restored. Using the time references (indicated as time stamps in the above table) and received signal strengths, the controller 130 may then generate path data comprising signal strengths that would be expected to be received from one or more WAPs along the path. Using the received signal powers from the WAP measurement data, the controller 130 may also determine a range of coverage for each detected WAP.

Alternatively, the user device 102 may not be operable to determine its own position while in the offline region 150 unless one or more paths are available from the local positioning data supplied by the positioning system controller 130. In this case, the WAP measurement data may be transmitted to the positioning system controller 130 when the user device 102 has left the offline region 150, and the positioning system controller 130 can retrospectively process the received data to generate a path through the offline region 150 based on the WAP measurement data and known WAP position data stored in the positioning database of the controller 130.

It will be understood that any manually entered position data (e.g. manual "check-in" data) logged by, or any data captured by additional sensors onboard, the user device 102 while it is within the offline region 150 may also be sent to the positioning system controller 130 (where it is stored) when the user device 102 has left the offline region 150. This data may be processed by the controller 130 to refine the path data (e.g. by refining the length of the path or its direction).

The generated paths may then be made available as part of the local positioning data supplied by the positioning system controller 130 to the (or another) user device 102 subsequently meeting the one or more proximity criteria with respect to the offline region 150.

Figure 9:
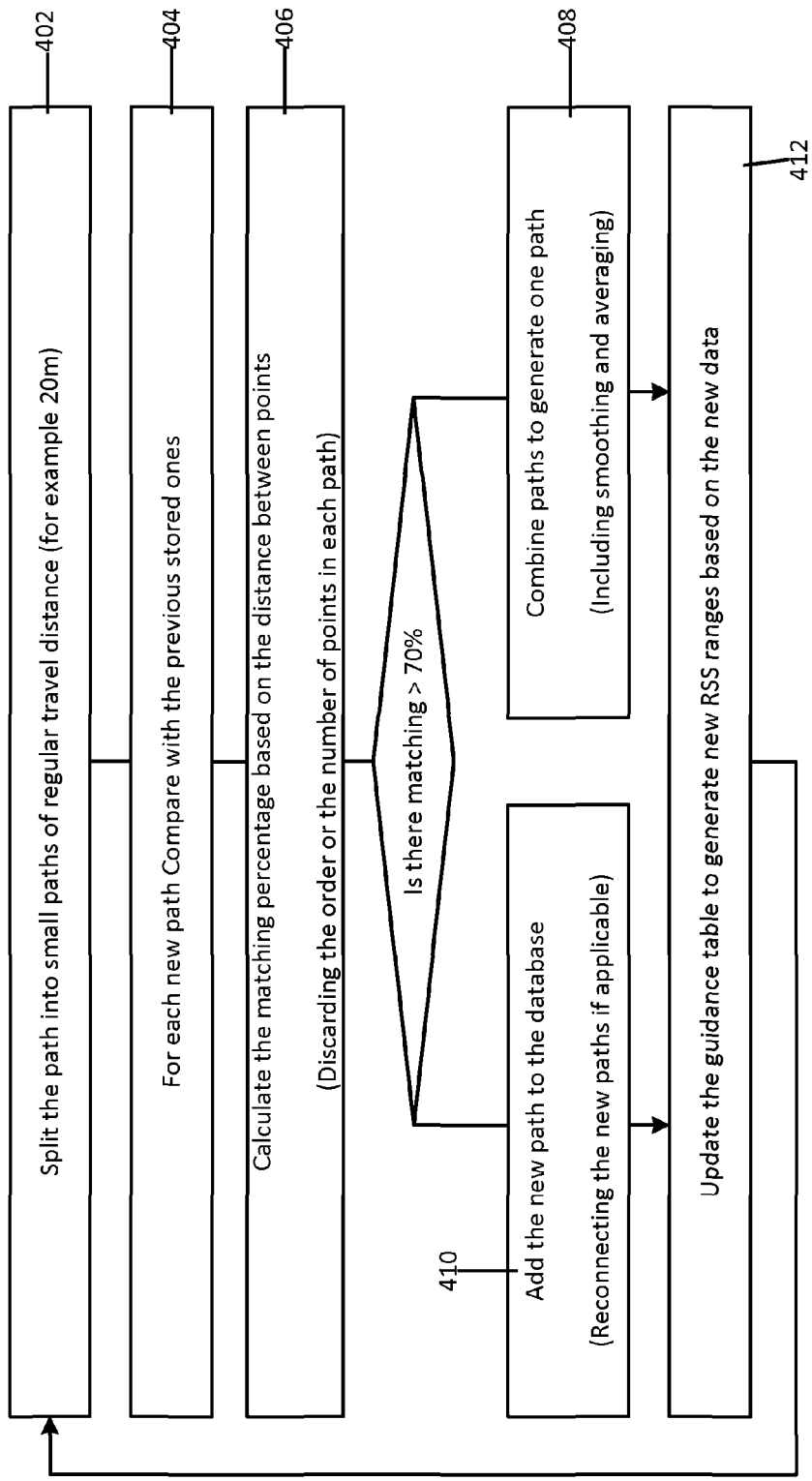
FIG. 9 illustrates a method for updating the positioning database with information received from a user device which is passed through an offline region.

When more than one user device 102 has passed through an offline region 150 (or where a single user device 102 has passed through the offline region 150 a plurality of times), the data transmitted by the second and further user devices 102 following their exit from the offline region 150 (or by the single user device 102 the second and subsequent times it leaves the offline region 150) to the positioning system controller 130 may be used by the controller to generate further paths or to improve the accuracy of existing paths within its database. A flow-chart illustrating this process is provided in FIG. 9.

At a first step 402, any existing paths in the controller database may be divided into smaller paths comprising a smaller travel distance than the entire path. At a second step 404, each newly generated path is compared to the paths previously stored in the positioning database (if any such paths have been previously stored). Next, at step 406, the controller 130 determines how closely the newly generated paths match with stored paths. If the newly generated path matches over 70% of an existing path, the matching paths are combined to generate a single (updated) path in step 408. This step may involve smoothing and averaging to avoid creating paths comprising anomalies resulting from the combination process. If the newly generated path does not match over 70% of an existing path (or there are no existing paths relating to that offline region 150 in the positioning database), a new path is added to the database in step 410. Step 410 may involve recombining the divided path segments into larger paths if applicable. Finally, in step 412, a look-up-table provided in the local positioning data of the positioning database may be updated with the new path data. This process may be repeated for each collection of data received from one or more user devices 102.

It will be understood that, in steps 406, 408 any suitable alternative percentage value (which may be significantly greater or less than the example which used 70% as discussed above) may be used in the comparison between detected paths and stored paths.

An offline region 150 may comprise only a single path for entering and exiting the offline region 150. For example, the offline region may comprise a railway tunnel. In this case, the positioning system controller 130 will continue to combine detected paths with stored paths in order to update and improve the WAP positions, signal strengths and ranges along that path. Unless one or more user devices 102 pick up a satellite positioning system signal within the offline region 150, or additional sensing data is captured by the user device 102, the generated path may remain limited to a straight line approximation.

Figure 10:
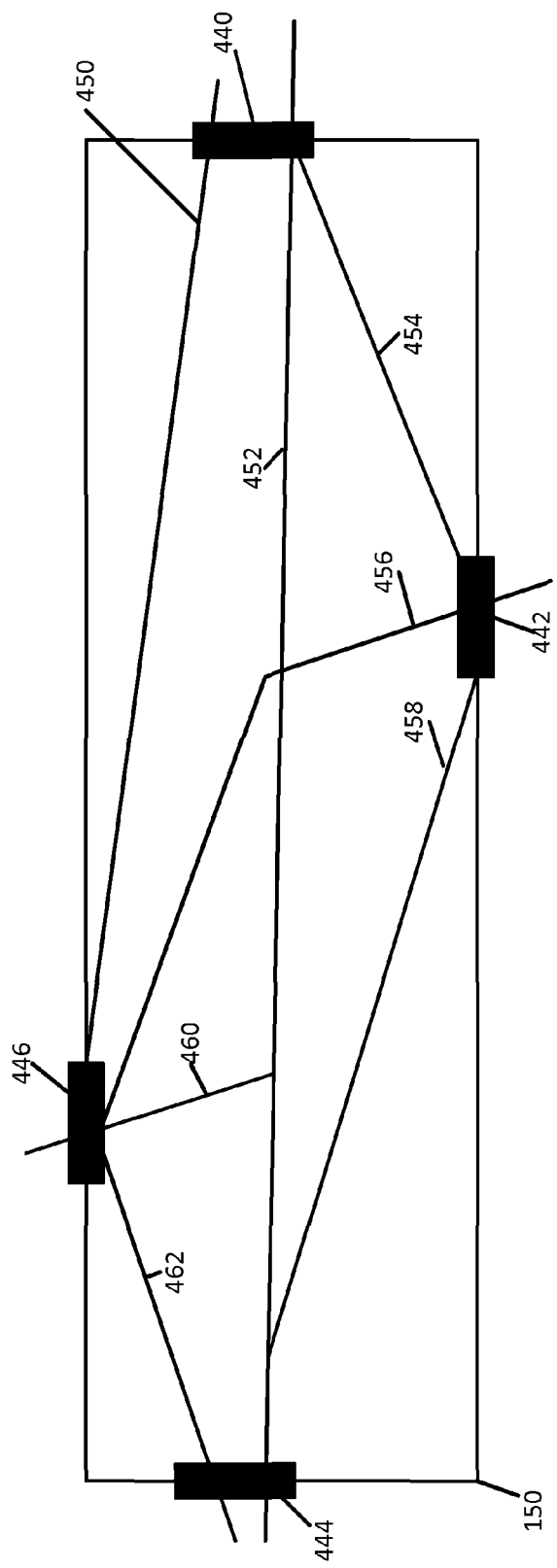
FIG. 10 shows an offline region having a plurality of entrances/exits and a plurality of routes which a user device may follow within the offline region.

Alternatively, an offline region 150 may comprise a plurality of entrances and/or exits, thus providing a plurality of possible routes which a user device 102 may follow when within the offline region. In this case, as explained above, after the user device 102 has passed through the offline region 150 multiple times, or after multiple user devices 102 have passed through the offline region 150, a plurality of paths may be determined, some of which may intersect. This allows a network of such paths to be created, which typically allow a sufficiently accurate estimate of the position of a user device 102 to be determined with a relatively low computational overhead. This is illustrated in FIG. 10 which shows an offline region 150 comprising 4 doors 440, 442, 444, 446 which may each act as an entrance to or exit from the offline region. Paths 450, 452, 454, 456, 458, 460, 462 extend between the doors, some segments of paths 450-462 overlapping. Again, where no satellite positioning or additional positioning data is available, the paths may simply comprise straight lines between entrances and exits to the offline region 150. However, where satellite positioning (e.g. GPS) and/or additional positioning data is available, more accurate path data may be generated using the procedure in FIG. 9.

As indicated above, the data gathered by the user device 102 when it is in the offline region 150 may include the MAC address, type and model of, and transmitted and received powers from, one or more WAPs. The gathered data may also include a period of time since an arbitrary start point (e.g. since communication with the positioning controller was lost), or the number of steps taken by a user (which might be determined from an analysis of the signals produced by an onboard 3D accelerometer). As explained above, the gathered data may also include directional data from a compass provided onboard the user device 102 and/or manually entered "check-in" data. This data may be processed by the processor 136 and the database in memory 138 may be updated accordingly to improve the accuracy of the local positioning data stored therein, particularly the data relating to the offline region 150.

Optionally, the positioning system controller 130 may process manually entered data together with data logged by additional sensors (such as a compass, accelerometer etc—see above) onboard the user device 102 in order to estimate (or refine the estimate of) one or more positions of the user device 102 within the offline region 102.

The data gathered by a single user device 102 passing through an offline region 150 once is typically insufficient to immediately allow a high resolution map of local positioning data to be generated immediately (although it may be possible to build up such a high resolution map over time, using data from multiple user devices 102). However, as explained above, the user device 102 may gather sufficient data for one or more paths to be determined, each of which specify the expected variation in received signal power from one or more WAPs along one or more routes within the offline region 150.

The paths may extend between floors of a building (or at least have associated data identifying the floor in which the path is located), allowing a user device 102 to determine what floor it is on at any given time.

As indicated above, the positioning controller 130 may transmit an estimate of the speed of movement of the user device 102 to the user device 102 just before it enters the offline region 150. When the user device 102 is moving at a consistent speed (e.g., when a person carrying the user device is walking at a broadly consistent speed, or the user device is within a vehicle progressing down a road, or along a track and/or in a tunnel), this consistent speed can be used by the user device 102 to improve estimates of its position whilst in the offline region 150. This also helps to improve the accuracy of the resulting data transmitted to the controller 130 following the emergence of the user device 102 from the offline region 150 and improves the quality of the data stored in the database in memory 138 of controller 130.

As indicated above, the data logged by the user device 102 when it is in the offline region 150 may be time referenced to the time it was received by the user device 102. It will be understood that the controller 130 may use this time data to model the path taken by the user device 102 through the offline region 150. Optionally, time referenced data may be processed by the processor 136 of the controller 130 in batches defined with respect to their time references. That is, the database of positioning data may be updated by the controller 130 in accordance with a plurality of batches of data received from the user device 102, the contents of the batches being determined at least partly by the time references applied to the data received from the device 102. The data may be divided into batches by either the user device 102 or (preferably) by the controller 130.

EXAMPLES

Four examples will now be described to explain how path data may be generated by the positioning system controller 130.

In a first example, an offline region 150 comprising a shopping centre is considered. A user device 102 (such as a mobile smartphone) may be carried by a user entering the shopping centre. Inside the shopping centre, the user device 102 is capable of obtaining a sufficiently strong satellite positioning system signal to determine its position using that signal, but the user device 102 is not able to communicate with the positioning system controller 130 via the data communications network. The user device 102 measures and logs data detected from a plurality of WAPs as the user walks through the shopping centre. When the user (and thus the user device) leaves the shopping centre, the user device 102 re-establishes communications with the positioning system controller 130 via the data communications network and transmits the satellite positioning data (or data derived therefrom) received while within the offline region, together with the WAP measurement data measured within the offline region, to the positioning system controller 130 via the data communications network. Next, the positioning system controller 130 generates path data from the WAP measurement and satellite positioning data received from the user device. Using the procedure in FIG. 9, the controller 130 decides whether to update an existing path or to create a new path. The updated/new path is then made available as part of local positioning data sent to the (or another) user device 102 subsequently entering the offline region 150 by the positioning system controller (i.e. when the or another user device meets the proximity criteria with respect to the offline region), allowing the user device 102 to estimate its position using the path data while it is within the offline region 150. As explained above, the path data may comprise the signal power expected to be received from one or more WAPs along a path within the offline region.

Where new paths are created, they may intersect existing paths. In this case, there will be junctions between multiple paths. In this case, it may be necessary for a user device to make a decision which of the multiple paths to follow at a junction. This decision can be based solely on a comparison of WAP measurement data received by a user device and the path data of said multiple paths. Additionally or alternatively, additional positioning data (e.g. directional information from a compass onboard the user device) may be used to help the user device 102 choose between intersecting paths.

In a second example, satellite positioning is unavailable within the shopping centre. In this case, rather than using satellite positioning data to generate the paths, the positioning system controller 130 uses the known positions of the WAPs detected within the offline region 150 (in combination with the WAP measurement data) to generate the paths. As above, the paths may comprise signal strengths expected to be received from one or more WAPs along a specific path. In the absence of existing path data in the local positioning data transmitted to the user device 102 prior to entering the offline region 150, the user device 102 may be operable to determine its position from WAP measurement data received within the offline region 150 together with known WAP positions provided in the local positioning data. Alternatively, the user device 102 may not be operable to determine its position while it is within the offline region. In this case, the positioning system controller 130 may determine the position of the user device 102 retrospectively from the WAP measurement data received from the user device 102 when communication with the user device 102 through the data communications network has been re-established. Optionally this position data may be retrospectively transmitted to the user device 102 by the controller 130.

In third and fourth examples, an offline region 150 comprising a railway tunnel following a straight line through a hillside is considered. In the third example, the positions of a plurality of WAPs within the offline region 150 are accurately known by the controller 130 before the user device enters the offline region 150. These WAP positions may have been determined by a prior systematic survey such as war-driving or war-walking, or for example by the procedure described in WO 2011/077166 (Arslan et al.) In a fourth example, the positions of WAPs within the offline region 150 are inaccurately known or not known at all when the user device 102 enters the offline region.

In the third example, a user device 102 may be carried by a user onboard a train approaching the tunnel (offline region 150). The database in memory 138 of the positioning system controller 130 may initially contain no path data inside the tunnel. When the train enters the tunnel, communication between the user device 102 and the controller 130, through the communication network, meets the one or more failure criteria at a first location. The time, speed (or velocity) and position of the user device 102 at the first location may be logged by the controller 130 in the database if, for example, the tunnel has not been previously identified as an offline region 150 by the controller 130. When the train emerges from the tunnel, full communication may be restored between the user device 102 and the controller 130 through the communication network at a second location. The time, speed and position of the user device 102 at the second location may then be logged by the controller 130. In addition, the signalling data measured by the user device 102 from the WAPs present within the tunnel are also transmitted to the controller. The controller 130 may then process the data received from the user device 102 to generate data representing a (straight line) path through the tunnel, the path data linking position information with signal data expected to be received from the WAPs inside the tunnel as explained above.

The controller 130 may first calculate the distance travelled by the user device 102 between the first and second locations, for example by assuming that the train continued to follow a constant speed following a straight line through the tunnel and using the time references logged at the first and second locations. Alternatively, where the positions of the user device 102 were logged at the first and second locations (e.g. via GPS), the distance between the known first and second locations may be calculated directly. The signalling data received from WAPs within the tunnel will typically have been time referenced to the time it was received by the user device 102. Knowing the distance travelled by the user device through the tunnel, the positions of the WAPs, the time at which the user device entered and exited the tunnel and the speed at which the user device entered and exited the tunnel, the controller 130 may proceed to estimate the position at which the user device 102 was located when each signal power measurement was made from the WAPs inside the tunnel and store these estimates in the positioning database. Interpolation may optionally be performed between the positions at which WAP signal measurements were made within the tunnel to increase the resolution of the path. In this way, data representing a straight line path through the tunnel may be generated. This path data can subsequently be used by the (or another) user device 102 the next time such a user device 102 travels through the tunnel, it being understood that said data would have been transmitted to the user device 102 by the controller 130 before it entered the tunnel. Such a user device 102 may thus estimate its own position whilst it is within the offline region 150 without having contact with the positioning system controller via the communication network.

Where the tunnel follows a curved path rather than a straight line path, the path generating stage may initially approximate the curved path to a straight line. However, a user (which may be the first user or a subsequent user) may additionally have manually entered to the user device 102 that the tunnel follows a curved path between the first and second locations. In this case, the controller 130 may assume that the path within the tunnel follows a curved path having constant curvature, the controller 130 estimating the position of the user device 102 accordingly. Alternatively, the user device 102 may comprise a compass (or other additional sensor(s)) which detects additional sensing information, for example which indicates that the tunnel has a curved shape. This additional sensing information would also be sent to the controller 130 when the user device has left the offline region 150, the controller 130 using this additional sensing data to generate data representing a curved path for use by the (or another) user device 102 subsequently entering the tunnel.

Additionally or alternatively, the user may have manually "checked in" at one or more positions within the tunnel, for example at a plurality of positions along a curved path. This additional position information may be transmitted to the controller 130 following the exit of the user device 102 from the tunnel, allowing the controller 130 to process the data in order to determine data representing a path through the tunnel more accurately.

More complex paths may be generated, particularly where GPS data and/or additional sensing data is available to the user device 102 whilst it is within the offline region. In addition, a network of such paths may be generated, particularly (but not exclusively) where a plurality of entrances to and/or exits from the offline region 150 are provided.

In general, where it is possible for the path followed by a user device within the offline region to be measured with reasonable accuracy, whether by the user device while it is in the offline region, or retrospectively, by the positioning system controller by analysis of measurements made by the user device, a path followed by a user device may be used as a path in connection with which path data is sent to subsequent user devices. The paths may be smoothed, with loops removed and so forth, or simply chosen to extend between points where a user, or a number of users, have travelled.

The generation of paths is more challenging when the offline region also includes a void zone where positioning is not initially available and wherein data concerning WAPs which may be present is not present in the database of positioning data. Nevertheless, it is possible to generate paths between locations where the position of a user device can be determined. In this case, additional data from sensors such as a compass or accelerometer, and the measurement of time can be particularly helpful. In a fourth example, the railway tunnel following a path through a hillside is again considered. However, as indicated above, in this case the positions of WAPs within the tunnel are inaccurately known (or not known at all) prior to the user device 102 entering the tunnel. In this case, data which is received and stored by the user device 102 when it is in the offline region 150 can be used to produce approximations of the position of such WAPs by use of the bridging method described in U.S. Patent Application No. 61/588,903, the contents of which are incorporated herein by virtue of this reference. This WAP position data can be used, together with the WAP signal data measured by the user device 102 within the tunnel, any additional sensing data or manual check-in data available, speed and time referencing information (and any other relevant available data) to generate data representing one or more paths within the tunnel (offline region 150) as explained above and illustrated in the third example.

Figure 11:
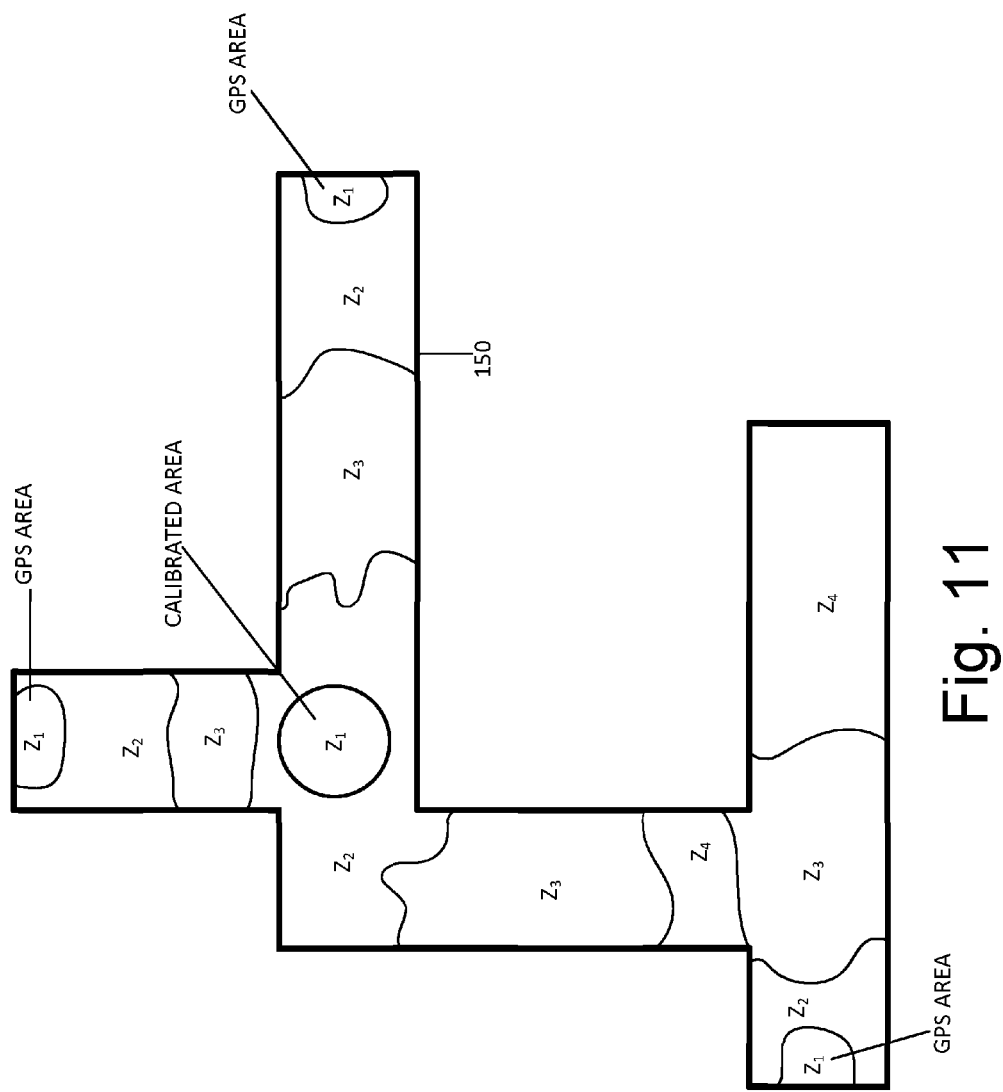
FIG. 11 is an illustration of a division of a building into signal emitting zones.

In essence, as illustrated in FIG. 11, the bridging method of U.S. Patent application No. 61/588,903 comprises dividing the offline region 150 into a plurality of signal emitting zones. All signal sources may be assigned a zone identifier ($Z_1$, $Z_2$, $Z_3$, ... $Z_n$) to assist with maintaining and updating the location database held by the positioning system controller 130 (and/or a partial, local copy thereof at a user device 102). The identifier is essentially one of a number of labels which, for convenience, are arranged in sequence.

The first label, in this case $Z_1$, is applied to WAPs (or other electromagnetic signal sources) which are located in areas where position accuracy is above a certain threshold, for example where GPS (or an alternative satellite positioning system) is available or within an area where the database comprises relatively high-resolution position data. These locations can be considered to be zone 1 (or, as noted, any other arbitrary label). A characteristic of this zone is that the margin of error in the position estimates is sufficiently low that the position estimates are essentially 'trusted' and can freely be used as the basis of other position estimates.

The second zone, zone 2 ($Z_2$) encompasses WAPs (or other sources) which do not fulfil the criteria to be zone 1 (for example because they are new, or because their locations are not possible to verify to a sufficiently high degree of accuracy using other methods such as GPS, for example because they are indoors) but which are within detection range (such as 100 meters, 200 meters, and so on) of WAPs in zone 1.

As the user device 102 moves further into the void zone, away from zone 1, it may identify further WAPs that are not within detection range of zone 1. These WAPs may be in the detection range of WAPs in zone 2, and are allocated the label 'zone 3', and so on, as the user heads further into the void zone.

Areas within the tunnel (offline region 150) in which a significant number of WAPs are unmapped, to the extent that reasonable position estimates cannot be obtained using the database stored in controller memory 138, are referred to herein as 'void zones'. Zones 2 and above are typically 'void zones' (since areas which are sufficiently calibrated to give very accurate position estimates are considered to be zone 1).

Eventually, a user device may reach a location where they find a second zone 1 region comprising one or more WAPs. For example, the user device may reach the other end of the tunnel and re-establish communication with the controller 130 via the communications network, or re-establish GPS communications or reach an accurately calibrated zone within the tunnel where the positions of WAPs is accurately known. There may alternatively or additionally be a WAP within the tunnel having a calibrated position (which might already be known, or transmitted by the WAP for example), and so on. This second zone 1 region may be an internal region of the tunnel, and may optionally be near one end of the tunnel.

When the user device 102 exits the tunnel and re-establishes communication with the positioning system controller 130 via the communications network, the user device 102 transmits the measured WAP signal data to the positioning system controller. The positions of WAPs in zone 2 may be estimated (typically by the controller 130) using data measured from the WAPs in zones 1 and 2 at multiple positions within zone 2 together with the known positions of WAPs in zone 1 and other zone 2 WAPs whose positions have already been identified. Similarly, the positions of WAPs in zone 3 may be estimated using data measured from the WAPs in zones 2 and 3 at multiple positions within zone 3 together with the estimated positions of WAPs in zone 2 and other zone 3 WAPs whose positions have already been estimated.

A user travelling through the tunnel (offline region 150) may record WAPs in a total of six zones, say, which would be labelled zone 1, zone 2, zone 3, zone 4, zone 5 and zone 6. On contact with a second zone 1 region adjacent zone 6, these zones can then be relabelled as zone 1, zone 2, zone 3, zone 4, zone 3 and zone 2 because the positions of WAPs within zones 5 and 6 can be (re-)estimated based on the data from the second zone 1 rather than from the original zone 1. Clearly the higher the zone number, the more unreliable the position estimates normally will be, and so being able to 'bridge' between two areas of zone 1 will normally improve the accuracy of the position information concerning the WAPs in the void regions. In FIG. 11 the different zones $Z_1$, $Z_2$, $Z_3$ and so on, and the effect of bridging in an example building can be seen.

When such a 'bridge' is built, the approximate locations of the WAPs in the newly discovered zone(s) within the tunnel can thus be corrected now that an accurate end position of the user device 102 can be re-established using data from the second zone 1 region. A number of different methods for re-estimating locations based on bridging information can be combined depending on the circumstances. This will now be illustrated in more detail with reference to a special case where data from two users is pooled, leading to more efficient estimation and updating.

FIGS. 12a to 12d are illustrations of the concept of bridging between known signal sources. In these figures, the paths of two user devices are shown travelling through a portion of the tunnel that forms a 'void zone'. Known and/or estimated positions of WAPs are illustrated in these figures with a four-pointed star.

Figure 12A:
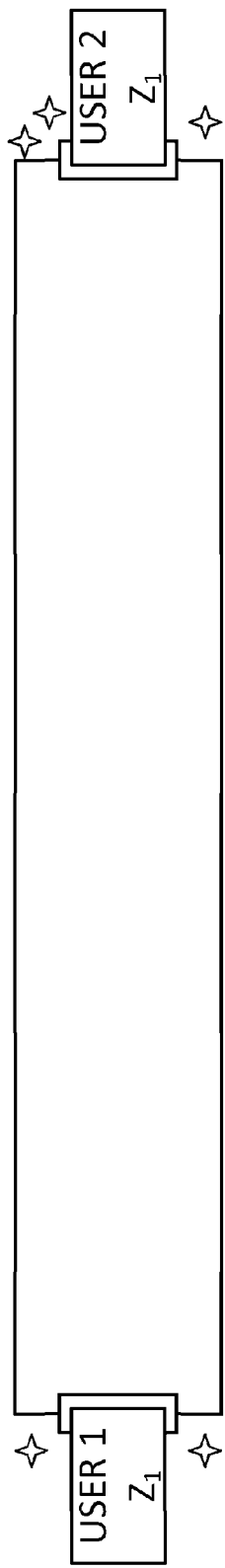
FIGS. 12a to 12d are illustrations of the concept of bridging between known signal sources.

In FIG. 12a, first and subsequent user devices (USER 1 and USER 2) are shown at opposite ends of the tunnel, in zone 1 ($Z_1$), where the position of the available WAPs (shown as four-pointed stars on the figure) is known with high confidence.

Figure 12B:
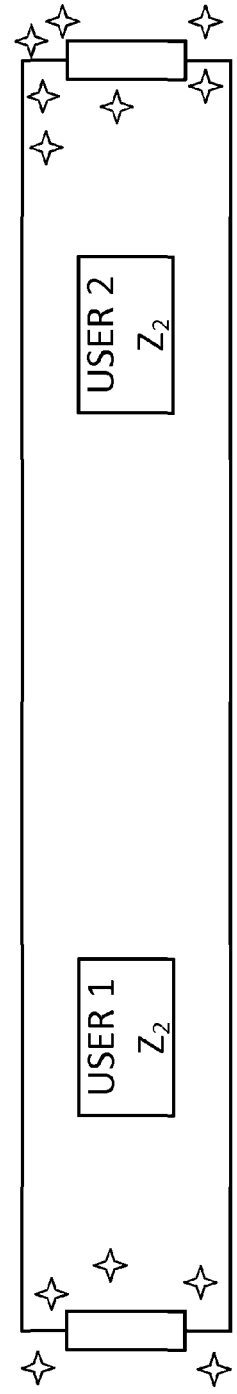

In FIG. 12b, the user devices enter zone 2 ($Z_2$), where they are still able to detect the WAPs in zone 1, and also others in the vicinity (also shown), whose position can be estimated with a more limited degree of accuracy.

Figure 12C:
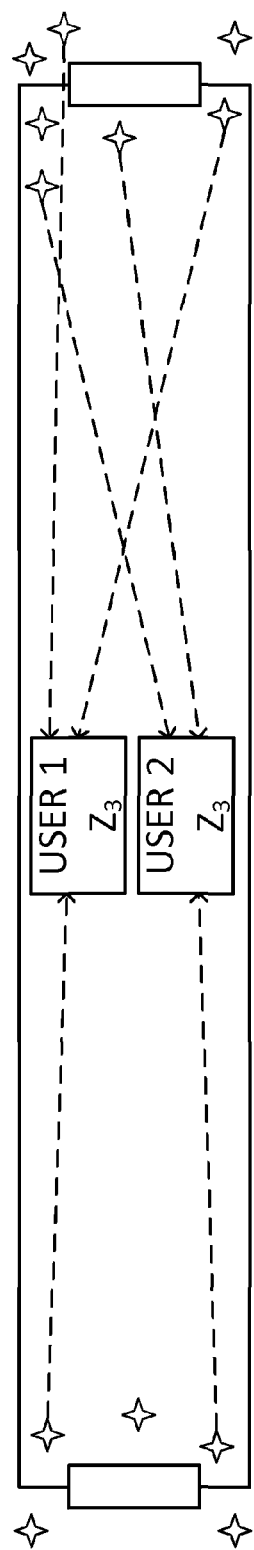

In FIG. 12c, the user devices meet in zone 3 ($Z_3$), where the WAPs in the zone 1 regions may no longer be detected by either device. The dotted lines indicate the signal paths of the signals that are received by USER 1 and USER 2. In this example the first user device is shown as receiving a signal from a WAP in zone 1; it will be appreciated that the classification of WAPs into zones is approximate and need not be rigorously applied. In this case, combining the data received by the first and subsequent user devices allows the bridge to be formed by the controller 130. Appropriate methods can then be used to (re-)estimate the positions of the formerly unknown WAPs in zones 2 and 3, based on the new information regarding the distance between the two exit points to the zone 1 regions and the signal data received inbetween. Further refinements can then more easily be made to the position estimates.

Figure 12D:
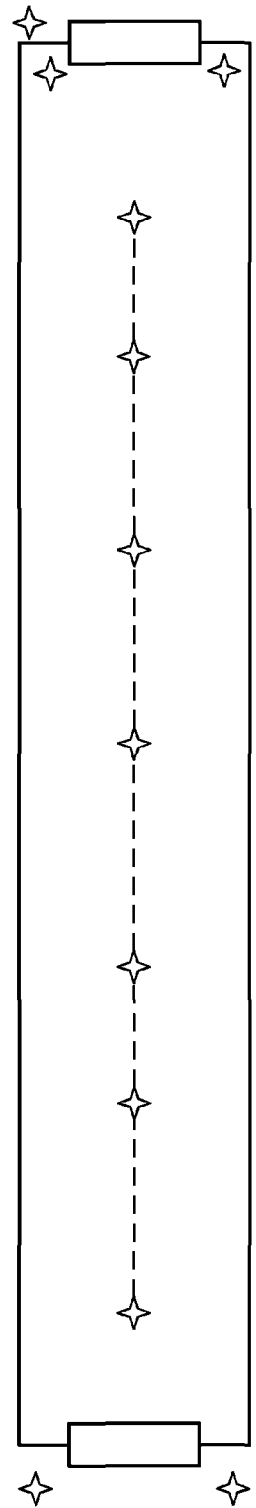

In FIG. 12d, the position estimates for intermediate WAPs (that is, WAPs on the bridge between the two zone 1 areas) are illustrated. The combined signal data from the two user devices, forwarded back to the positioning system controller 130 or, in a variant, shared between the user devices and transmitted by one of the user devices to the positioning system controller 130, allows at the very least an approximate estimate of the relative distances between the unmapped WAPs. In a very simple approximation, the unmapped WAPs are then mapped onto the dotted line between the two zone 1 areas which was (approximately) followed by both user devices, in concordance with the approximate relative distances between the WAPs as recorded by the user devices. Position estimates can later be improved when necessary, for example by moving laterally within the corridor as well as moving along it in a straight line.

The best estimates of WAP position may be stored in the database in memory 138 and may be used by the controller 130, together with signal data from these WAPs measured by the user device 102 while within these zones (and any manual check-in or additional sensor data where available), to generate path data as described above in the third example for use by the (or another) user device 102 subsequently entering the tunnel.

In the above example two user devices were shown, but it will be appreciated that the process can be carried out by any number of users, including only one user, who may for example walk back and forth to obtain the desired effect. The process can be improved if the users carrying out the bridging process are monitoring their position and, for example, supplying their own approximate position estimates based on a crude estimation by eye, and the like, and/or an estimate of the distance between each other. Bridging typically takes place indoors, or between outdoor areas where GPS is available. Thus, measurements can be made along a path extending between two regions of high confidence enabling an estimate of the position of multiple WAPs along that path arising from a single trip by a user.

When the positioning controller 130 updates the database stored in memory 138 with positioning information, it may prioritise positioning information determined by GPS over the other means described above because it typically has the greatest accuracy. If GPS was not available at a given position, positioning information determined by additional sensing data received by the user device 102 (e.g. data from compass, accelerometer etc onboard user device 102 or manually input by a user) may be prioritised over the positioning information derived from data received from WAPs within the offline region.

It will be understood that, rather than GPS, other satellite positioning systems may be provided. Additionally, the WAPs need not use Wi-Fi and may alternatively use any other wireless standard including Bluetooth, ZigBee etc.

Further modifications and variations may be made within the scope of the invention herein disclosed.

The invention claimed is:

1. A method of estimating the position of a user device, the user device being initially in electronic communication with a positioning system controller through a communication network, the method comprising:

determining that a user device meets one or more proximity criteria with respect to an offline region where electronic communication between the user device and the positioning system controller, through the communication network, is expected to meet one or more failure criteria and responsive thereto and in advance of the user device entering the said offline region, the positioning system controller transmitting local positioning data to the user device, the local positioning data comprising data concerning one or more electromagnetic signal sources in the said offline region, and the user device subsequently estimating its position whilst it is within the offline region by measuring signal data from a plurality of electromagnetic signal sources and processing the measured signal data and the local positioning data.

2. A method according to claim 1, wherein the local positioning data comprises data concerning identifiers of one or more electromagnetic signal sources and the strength of received signals expected from the respective one or more electromagnetic signal sources at each of a plurality of positions within the offline region.

3. A method according to claim 2, wherein the data concerning the strength of received signals expected from the respective one or more electromagnetic signal sources at each of a plurality of positions within the offline region takes the form of data specifying an expected variation in the received signal strength of one or more electromagnetic signal sources along one or more paths.

4. A method according to claim 3 further comprising the user device estimating the position of the user device as being located along a path selected from the said one or more paths at a position determined taking into account the said data specifying the expected variation in received signal strength along one or more paths and the measured signal data.

5. A method according to claim 1, wherein the location of electromagnetic signal sources within the offline region is not transmitted to the user device.

6. A method according to claim 3, comprising the step of generating data representing a path in response to detection that a user device has passed through an offline region from a first position to a second position, the path extending from the first position to the second position.

7. A method according to claim 3, wherein the local positioning data comprises data concerning the strength of received signals expected from an electromagnetic signal source at a plurality of positions within the offline region along each of a plurality of paths, wherein the plurality of paths form a network.

8. A method according to claim 7, wherein, within the offline region, the user device follows its position through the network of paths, keeping track of which path most closely fits its position and using the measured signal strength data to determine which path of a plurality of paths meeting at a junction most closely fits the movement of the user device.

9. A method according to claim 1, further comprising the user device storing signal data concerning signals received from electromagnetic signal sources received by the user device within the offline region and subsequently transmitting the stored signal data, or data derived therefrom, to the positioning system controller.

10. A method according to claim 9, further comprising the step carried out by the positioning system controller of updating the database of positioning data in respect of the offline region in response to the said signal data received from the user device.

11. A method according to claim 10, further comprising referencing the stored signal data, or data derived therefrom, which is transmitted to the positioning system controller to the time at which the respective signals were received by the user device.

12. A method according to claim 11 wherein the positioning system controller uses the time references to model the path that has been followed by the user device.

13. A method according to claim 12 wherein the positioning system controller processes the stored signal data or data derived therefrom, which is transmitted to the positioning system controller by the user device, in batches, the contents of each of a plurality of said batches being determined at least partly by the time references allocated to the data.

14. A method according to claim 9, wherein the positioning system controller stores offline region data concerning said offline region, the method further comprising logging when communication between the positioning system controller and the user device through the communication network meets one or more failure criteria and updating the stored offline region data accordingly.

15. A method according to claim 9, wherein it may be determined that a user device is approaching an offline region where electronic communication by way of the communication network is expected to be meet one or more failure criteria responsive to a trigger signal generated by the user device.

16. A method according to claim 1, comprising transmitting an estimate of the speed or velocity at which the user device is moving to the user device before it enters the offline region.

17. A method according to claim 1 further comprising the user device capturing additional position data.

18. A method according to claim 17 wherein at least part of the additional position data is manually entered to the user device by a user.

19. A method according to claim 17 wherein at least part of the additional position data is captured by a sensor of the user device.

20. A method according to claim 17 further comprising the user device estimating its position whilst it is within the offline region using said additional position data.

21. A method according to claim 20 further comprising the user device prioritising said additional position data over said local positioning data, and the user device estimating its position whilst it is within the offline region using said additional position data without using said local positioning data.

22. A method according to claim 17 further comprising transmitting said additional position data from said user device to the positioning system controller.

23. A method according to claim 22 further comprising the positioning system controller updating said local positioning data using the additional position data transmitted from said user device.

24. A method according to claim 22 wherein the step of updating said local positioning data comprises updating data specifying an expected variation in received signal strength along one or more paths.

25. A method according to claim 22 wherein the additional position sensing data is transmitted from said user device to the positioning system controller through said communication network when the user device has left said offline region and said communication network is available to the user device.

26. A method according to claim 22 further comprising
determining that a subsequent user device meets one or more proximity criteria with respect to said offline region where electronic communication between the subsequent user device and the positioning system controller, through the communication network, is expected to meet one or more failure criteria and responsive thereto and in advance of the subsequent user device entering the said offline region, the positioning system controller transmitting updated local positioning data and/or some or all of said additional position sensing data to the subsequent user device,
and the subsequent user device subsequently estimating its position whilst it is within the offline region by measuring signal data from a plurality of electromagnetic signal sources and processing the measured signal data, the updated local positioning data and/or the said some or all of said additional position sensing data.

27. A method according to claim 1 wherein said local positioning data comprises positioning data in three dimensions.

28. A method according to claim 27 wherein said local positioning data comprises the identification of a floor of a building.

29. A method according to claim 28 wherein one or more of said one or more paths extends between two or more floors of a building.

30. A method according to claim 1 wherein said local positioning data comprises a look up table which can be interrogated by the user device to determine its position.

31. A system for estimating the position of a user device, the system comprising:
a communication network;
said user device;
a positioning system controller initially in communication with said user device through said communication network; and
one or more electromagnetic signal sources located in an offline region where electronic communication between the user device and the positioning system controller, through the communications network, is expected to meet one or more failure criteria;
wherein the positioning system controller is configured to determine that said user device meets one or more proximity criteria with respect to said offline region and, in response thereto, the positioning system controller is configured to transmit local positioning data to the user device, the local positioning data comprising data concerning one or more of said electromagnetic signal sources in the said offline region, and wherein the user device is configured to estimate its position whilst it is within the offline region by measuring signal data from one or more said electromagnetic signal sources and by processing the measured signal data and the local positioning data.

* * * * *